US009407686B2

(12) United States Patent
Runstedler et al.

(10) Patent No.: US 9,407,686 B2
(45) Date of Patent: Aug. 2, 2016

(54) DEVICE TO-DEVICE TRANSFER

(75) Inventors: Christopher Runstedler, Cambridge (CA); Rohit Jain, Waterloo (CA); Michael Hardy, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 915 days.

(21) Appl. No.: 12/395,083

(22) Filed: Feb. 27, 2009

(65) Prior Publication Data
US 2010/0223359 A1    Sep. 2, 2010

(51) Int. Cl.
| G06F 15/16 | (2006.01) |
| H04L 29/08 | (2006.01) |
| H04W 4/08 | (2009.01) |
| H04W 8/18 | (2009.01) |
| H04W 12/06 | (2009.01) |

(52) U.S. Cl.
CPC ............ *H04L 67/06* (2013.01); *H04L 67/325* (2013.01); *H04W 4/08* (2013.01); *H04W 8/186* (2013.01); *H04W 12/06* (2013.01)

(58) Field of Classification Search
CPC ....... H04W 4/08; H04W 8/186; H04W 12/06; H04L 67/325; H04L 67/06
USPC ................................ 709/201–206, 217–232
See application file for complete search history.

(56) References Cited

U.S. PATENT DOCUMENTS

| 5,999,611 | A | 12/1999 | Tatchell et al. |
| 6,160,877 | A | 12/2000 | Tatchell et al. |
| 6,223,291 | B1 | 4/2001 | Puhl et al. |
| 6,259,405 | B1 | 7/2001 | Stewart et al. |
| 6,301,484 | B1 | 10/2001 | Rogers et al. |
| 6,393,484 | B1 | 5/2002 | Massarani |
| 6,397,246 | B1 | 5/2002 | Wolfe |
| 6,430,170 | B1 | 8/2002 | Saints et al. |
| 6,542,491 | B1 | 4/2003 | Tari et al. |
| 6,581,025 | B2 | 6/2003 | Lehman |
| 6,591,095 | B1 | 7/2003 | Palaniswamy |
| 6,615,038 | B1 | 9/2003 | Moles et al. |
| 6,628,928 | B1 | 9/2003 | Crosby et al. |
| 6,675,165 | B1 | 1/2004 | Rothschild |
| 6,684,397 | B1 | 1/2004 | Byer et al. |
| 6,721,578 | B2 | 4/2004 | Minear et al. |
| 6,728,531 | B1 | 4/2004 | Lee et al. |
| 6,781,236 | B2 | 8/2004 | Shimooka et al. |

(Continued)

FOREIGN PATENT DOCUMENTS

| EP | 0973299 A2 | 1/2000 |
| EP | 1014629 | 6/2000 |

(Continued)

OTHER PUBLICATIONS

"GloMop: Global Mobile Computing by Proxy", *White Paper, GloMop Group*, (Sep. 13, 1995), 12 pgs.

(Continued)

*Primary Examiner* — Abdullahi E Salad
(74) *Attorney, Agent, or Firm* — Jeffrey N. Giunta; Fleit Gibbons Gutman Bongini & Bianco P.L.

(57) ABSTRACT

Apparatus and methods to engage in a transfer of informational content between a first mobile electronic device and a second mobile electronic device using directed transmission between a first server and a second server. Additional apparatus, systems, and methods are disclosed.

26 Claims, 11 Drawing Sheets

(56) References Cited

U.S. PATENT DOCUMENTS

| | | | |
|---|---|---|---|
| 6,804,523 B2 | 10/2004 | Shiraga | |
| 6,944,760 B2 | 9/2005 | Wils | |
| 6,968,389 B1 | 11/2005 | Menditto et al. | |
| 6,981,020 B2 | 12/2005 | Miloslavsky et al. | |
| 6,993,326 B2 | 1/2006 | Link, II et al. | |
| 7,043,263 B2 | 5/2006 | Kaplan et al. | |
| 7,069,319 B2 | 6/2006 | Zellner et al. | |
| 7,107,045 B1 | 9/2006 | Knoop | |
| 7,127,241 B2 | 10/2006 | Castrogiovanni et al. | |
| 7,171,199 B1* | 1/2007 | Rahman | 455/433 |
| 7,227,930 B1 | 6/2007 | Othmer et al. | |
| 7,233,975 B1 | 6/2007 | Gerraty et al. | |
| 7,236,769 B2 | 6/2007 | Irlam et al. | |
| 7,349,710 B2 | 3/2008 | Kaplan et al. | |
| 7,415,439 B2* | 8/2008 | Kontio et al. | 705/53 |
| 7,430,472 B2 | 9/2008 | Zhao et al. | |
| 7,447,497 B2 | 11/2008 | Okita et al. | |
| 7,480,264 B1 | 1/2009 | Duo et al. | |
| 7,516,478 B2 | 4/2009 | Limont et al. | |
| 7,526,278 B2 | 4/2009 | Link, II et al. | |
| 7,636,574 B2 | 12/2009 | Poosala | |
| 7,639,654 B2 | 12/2009 | Riazi et al. | |
| 7,640,039 B2 | 12/2009 | Kamada | |
| 7,640,293 B2 | 12/2009 | Wilson et al. | |
| 7,647,409 B2 | 1/2010 | Banerjee et al. | |
| 7,657,271 B2 | 2/2010 | Kim | |
| 7,676,516 B2 | 3/2010 | Boukobza | |
| 7,702,915 B2* | 4/2010 | McCann et al. | 713/184 |
| 7,773,981 B2 | 8/2010 | Okita et al. | |
| 7,917,641 B2 | 3/2011 | Crampton | |
| 7,945,642 B1 | 5/2011 | Hung et al. | |
| 7,970,430 B2 | 6/2011 | Backof, Jr. et al. | |
| 7,986,635 B2 | 7/2011 | Kawamura | |
| 8,005,922 B2 | 8/2011 | Boudreau et al. | |
| 8,065,361 B2 | 11/2011 | Runstedler | |
| 8,086,677 B2 | 12/2011 | Murphy | |
| 2002/0013155 A1 | 1/2002 | Jamthe et al. | |
| 2002/0013850 A1 | 1/2002 | Mitchell et al. | |
| 2003/0008662 A1 | 1/2003 | Stern et al. | |
| 2003/0041125 A1 | 2/2003 | Salomon | |
| 2003/0078036 A1 | 4/2003 | Chang et al. | |
| 2003/0119386 A1 | 6/2003 | Laux et al. | |
| 2003/0142653 A1* | 7/2003 | Jiang et al. | 370/338 |
| 2003/0236823 A1 | 12/2003 | Patzer et al. | |
| 2004/0024795 A1 | 2/2004 | Hind et al. | |
| 2004/0042432 A1 | 3/2004 | Riazi et al. | |
| 2004/0053602 A1 | 3/2004 | Wurzburg | |
| 2004/0180673 A1 | 9/2004 | Adams et al. | |
| 2004/0198456 A1 | 10/2004 | Kelkar | |
| 2004/0209650 A1 | 10/2004 | Pearce | |
| 2004/0225525 A1 | 11/2004 | Weitzman | |
| 2004/0249846 A1 | 12/2004 | Randall et al. | |
| 2004/0249961 A1 | 12/2004 | Katsube et al. | |
| 2004/0267873 A1 | 12/2004 | Shen et al. | |
| 2005/0018695 A1* | 1/2005 | Ramaswamy et al. | 370/400 |
| 2005/0102328 A1 | 5/2005 | Ring et al. | |
| 2005/0141447 A1 | 6/2005 | Carlton et al. | |
| 2005/0233693 A1 | 10/2005 | Karaoguz et al. | |
| 2005/0239034 A1 | 10/2005 | McKeagney et al. | |
| 2006/0021059 A1 | 1/2006 | Brown et al. | |
| 2006/0053380 A1 | 3/2006 | Spataro et al. | |
| 2006/0167940 A1* | 7/2006 | Colton et al. | 707/104.1 |
| 2006/0167985 A1 | 7/2006 | Albanese et al. | |
| 2006/0277408 A1 | 12/2006 | Bhat et al. | |
| 2007/0006289 A1 | 1/2007 | Limont et al. | |
| 2007/0023292 A1 | 2/2007 | Kim | |
| 2007/0027920 A1 | 2/2007 | Alvarado et al. | |
| 2007/0073874 A1 | 3/2007 | Moghaddam et al. | |
| 2007/0087682 A1 | 4/2007 | DaCosta | |
| 2007/0180119 A1 | 8/2007 | Khivesara et al. | |
| 2007/0232268 A1 | 10/2007 | Park et al. | |
| 2007/0299918 A1 | 12/2007 | Roberts | |
| 2008/0036591 A1 | 2/2008 | Ray | |
| 2008/0095373 A1* | 4/2008 | Nagata et al. | 380/278 |
| 2008/0096537 A1 | 4/2008 | Milojkovic et al. | |
| 2008/0126803 A1 | 5/2008 | Ginter et al. | |
| 2008/0134018 A1 | 6/2008 | Kembel et al. | |
| 2008/0189373 A1 | 8/2008 | Ikonen et al. | |
| 2008/0208956 A1 | 8/2008 | Spiridellis et al. | |
| 2008/0216148 A1 | 9/2008 | Bienek et al. | |
| 2008/0222711 A1 | 9/2008 | Michaelis | |
| 2008/0256204 A1 | 10/2008 | Kamat et al. | |
| 2008/0261569 A1 | 10/2008 | Britt et al. | |
| 2009/0028049 A1 | 1/2009 | Boudreau et al. | |
| 2009/0030968 A1 | 1/2009 | Boudreau et al. | |
| 2009/0030974 A1 | 1/2009 | Boudreau et al. | |
| 2009/0030995 A1 | 1/2009 | Boudreau | |
| 2009/0031250 A1 | 1/2009 | Boudreau | |
| 2009/0031296 A1 | 1/2009 | Boudreau et al. | |
| 2009/0034463 A1 | 2/2009 | Rao | |
| 2009/0036111 A1 | 2/2009 | Danford et al. | |
| 2009/0068994 A1 | 3/2009 | Murphy | |
| 2009/0070429 A1 | 3/2009 | Murphy | |
| 2009/0125521 A1 | 5/2009 | Petty | |
| 2009/0138547 A1 | 5/2009 | Boudreau | |
| 2009/0292799 A1 | 11/2009 | Eisener et al. | |
| 2010/0223321 A1 | 9/2010 | Runstedler et al. | |
| 2010/0306258 A1 | 12/2010 | Espino | |
| 2012/0066299 A1 | 3/2012 | Runstedler et al. | |
| 2012/0096101 A1 | 4/2012 | Murphy | |

FOREIGN PATENT DOCUMENTS

| | | |
|---|---|---|
| EP | 1158438 A2 | 11/2001 |
| EP | 1383347 | 1/2004 |
| EP | 1531641 | 5/2005 |
| EP | 1684535 A1 | 7/2006 |
| EP | 1750422 | 2/2007 |
| WO | WO-02044958 A1 | 6/2002 |
| WO | WO-02087188 A1 | 10/2002 |
| WO | WO-03048964 A1 | 6/2003 |
| WO | WO-2007130214 A2 | 11/2007 |

OTHER PUBLICATIONS

"GloMop: Global Mobile Computing by Proxy, GloMop Technology Overview", fox@cs.berkeley.edu—Armando's home page; file:/C:\unzipped\pythia_demo_pages\pythia\index.html, White Paper. Dated Jul. 6, 2005, (Downloaded Jul. 6, 2005), 11 pgs.

Bartlett, Joel F., "Experience with a Wireless World Wide Web Client", *WRL Technical Note TN-46*, White Paper, This is a preprint of a paper that will be presented at IEEE Spring COMPCON95, San Francisco, California, Mar. 5-9, 1995, (Mar. 1995), 17 pgs.

Courtois, Todd, et al., "Portal: a PDA to World Wide Web Interface", *PDA Developers vol. 3.1*, (Jan./Feb. 1995), 18-20.

Greenberg, S., et al., "POAs and Shared Public Displays: Making Personal Information Public, and Public Information Personal", *Personal Technologies*, (Mar. 1999), 11 pgs.

Joshi, Anupam, "Mowser: Mobile Platforms and Web Browsers", *Bulletin of the IEEE Technical Committee on Operating Systems and Application Environments 8*, No. 1, (1996), 6 pgs.

Watson, T., "Application design for wireless computing", *Workshop on Mobile Computing Systems and Applications*, 1994. Proceedings. Workshop on Mobile Computing Systems and Applications; Citation: Dec. 8-9, 1994, Santa Cruz, CA, (1994), 91-94.

U.S. Appl. No. 12/172,015, filed Jul. 11, 2008, Wireless Communication Systems.

U.S. Appl. No. 12/172,037, filed Jul. 11, 2008, Administration of Wireless Devices in a Wireless Communication System.

U.S. Appl. No. 12/171,858, filed Jul. 11, 2008, Wireless Communication System Installation.

U.S. Appl. No. 12/171,975, filed Jul. 11, 2008, Administration of Policies for Wireless Devices in a Wireless Communication System.

U.S. Appl. No. 12/171,950, filed Jul. 11, 2008, Apparatus and Methods for Coordination of Wireless Systems.

U.S. Appl. No. 11/829,885, filed Jul. 28, 2007, Administration of Wireless Systems.

U.S. Appl. No. 11/829,884, filed Jul. 28, 2007, Information Exchange in Wireless Servers.

(56) References Cited

OTHER PUBLICATIONS

U.S. Appl. No. 12/172,051, filed Jul. 11, 2008, Administration of Wireless Systems.
U.S. Appl. No. 13/335,851 filed Dec. 22, 2011, Information Exchange in Wireless Servers.
U.S. Appl. No. 12/171,887, filed Jul. 11, 2008, Appartus and Methods for Operation of a Wireless Server.
U.S. Appl. No. 11/829,872, filed Jul. 27, 2007, Method and System for Resource Sharing.
U.S. Appl. No. 12/171,925, filed Jul. 11, 2008, Method and System for Resource Sharing.
U.S. Appl. No. 12/172,026, filed Jul. 11, 2008, Remote Administration of Mobile Wireless Devices.
U.S. Appl. No. 13/301,006, filed Nov. 21, 2011, Data Hub Server.
"U.S. Appl. No. 12/171,858, Final Office Action mailed May 4, 2012", 22 pgs.
"U.S. Appl. No. 12/171,858, Non Final Office Action mailed Oct. 14, 2011", 19 pgs.
"U.S. Appl. No. 12/171,858, Response filed Jan. 13, 2012 to Non Final Office Action mailed Oct. 14, 2011", 14 pgs.
"U.S. Appl. No. 12/171,887, Non Final Office Action mailed Mar. 15, 2012", 5 pgs.
"U.S. Appl. No. 12/171,887, Non Final Office Action mailed Sep. 14, 2011", 5 pgs.
"U.S. Appl. No. 12/171,887, Response filed Jan. 13, 2012 to Non Final Office Action mailed Sep. 14, 2011", 13 pgs.
"U.S. Appl. No. 12/171,887, Response filed Jun. 14, 2012 to Non Final Office Action mailed Mar. 15, 2012", 14 pgs.
"U.S. Appl. No. 12/171,925, Final Office Action mailed Jun. 22, 2012", 23 pgs.
"U.S. Appl. No. 12/171,925, Non Final Office Action mailed Jul. 25, 2011", 23 pgs.
"U.S. Appl. No. 12/171,925, Response filed Jan. 25, 2012 to Non Final Office Action mailed Jul. 25, 2011", 20 pgs.
"U.S. Appl. No. 12/171,940, Notice of Allowance mailed Apr. 18, 2011", 5 pgs.
"U.S. Appl. No. 12/171,950, Non Final Office Action mailed Mar. 13, 2012", 6 pgs.
"U.S. Appl. No. 12/171,950, Response filed Jun. 13, 2012 to Non Final Office Action mailed Mar. 13, 2012", 23 pgs.
"U.S. Appl. No. 12/171,975, Final Office Action mailed May 12, 2011", 21 pgs.
"U.S. Appl. No. 12/171,975, Response filed Feb. 28, 2011 to Non Final Office Action mailed Oct. 28, 2010", 13 pgs.
"U.S. Appl. No. 12/171,975, Response filed Sep. 12, 2011 to Final Office Action mailed May 12, 2011", 13 pgs.
"U.S. Appl. No. 12/172,006, Examiner Interview Summary mailed Mar. 30, 2011", 2 pgs.
"U.S. Appl. No. 12/172,006, Final Office Action mailed Apr. 27, 2011", 15 pgs.
"U.S. Appl. No. 12/172,006, Notice of Allowance mailed Aug. 26, 2011", 5 pgs.
"U.S. Appl. No. 12/172,006, Response filed Feb. 14, 2011 to Non Final Office Action mailed Oct. 14, 2010", 10 pgs.
"U.S. Appl. No. 12/172,006, Response filed Jul. 27, 2011 to Final Office Action mailed Apr. 27, 2011", 7 pgs.
"U.S. Appl. No. 12/172,015, Advisory Action mailed Jan. 27, 2011", 3 pgs.
"U.S. Appl. No. 12/172,015, Non Final Office Action mailed Mar. 27, 2012", 5 pgs.
"U.S. Appl. No. 12/172,015, Response filed Jan. 18, 2011 to Final Office Action mailed Nov. 18, 2010", 15 pgs.
"U.S. Appl. No. 12/172,026, Non Final Office Action mailed Apr. 4, 2012", 8 pgs.
"U.S. Appl. No. 12/172,037 , Response filed Mar. 27, 2012 to Non Final Office Action mailed Sep. 27, 2011", 12 pgs.
"U.S. Appl. No. 12/172,037, Non Final Office Action mailed Sep. 27, 2011", 10 pgs.
"U.S. Appl. No. 12/172,051, Final Office Action mailed Jun. 11, 2012", 14 pgs.
"U.S. Appl. No. 12/172,051, Non Final Office Action mailed Sep. 1, 2011", 11 pgs.
"U.S. Appl. No. 12/172,051, Response filed Jan. 31, 2012 to Non Final Office Action mailed Sep. 1, 2011", 12 pgs.
"U.S. Appl. No. 12/394,994, Final Office Action mailed Apr. 13, 2011", 7 pgs.
"U.S. Appl. No. 12/394,994, Notice of Allowance mailed Jul. 1, 2011", 8 pgs.
"U.S. Appl. No. 12/394,994, Response filed Jan. 18, 2011 to Non Final Office Action mailed Oct. 18, 2010", 15 pgs.
"U.S. Appl. No. 12/394,994, Response filed Jun. 13, 2011 to Final Office Action mailed Apr. 13, 2011", 14 pgs.
"U.S. Appl. No. 13/335,851, Non Final Office Action mailed Apr. 3, 2012", 34 pgs.
"Canadian Application Serial No. 2,670,855, Office Action mailed Feb. 14, 2012", 3 pgs.
"Canadian Application Serial No. 2,670,855, Office Action mailed Apr. 14, 2011", 3 Pgs.
"Canadian Application Serial No. 2,670,855, Response filed Oct. 14, 2011, to Office Action mailed Apr. 14, 2011", 20 pgs.
"European Application Serial No. 09153893.4, Response filed Nov. 10, 2009 to Extended European Search Report mailed Aug. 20, 2009", 18 pgs.
Article 94(3) EPC from related European Patent Application No. 09153893.4 dated Mar. 11, 2013; 4 pages.

* cited by examiner

DEVICE TO-DEVICE TRANSFER

BACKGROUND

Access to information is an important factor in the activities of individuals in modern society. Improvements to the flow of information enhance one's ability to interact with others, to respond to changing needs, and to avail oneself of enjoyment from processing various media based information.

BRIEF DESCRIPTION OF THE DRAWINGS

Embodiments of the invention are illustrated by way of example and not limitation in the figures of the accompanying drawings in which.

DETAILED DESCRIPTION

Figure 1:
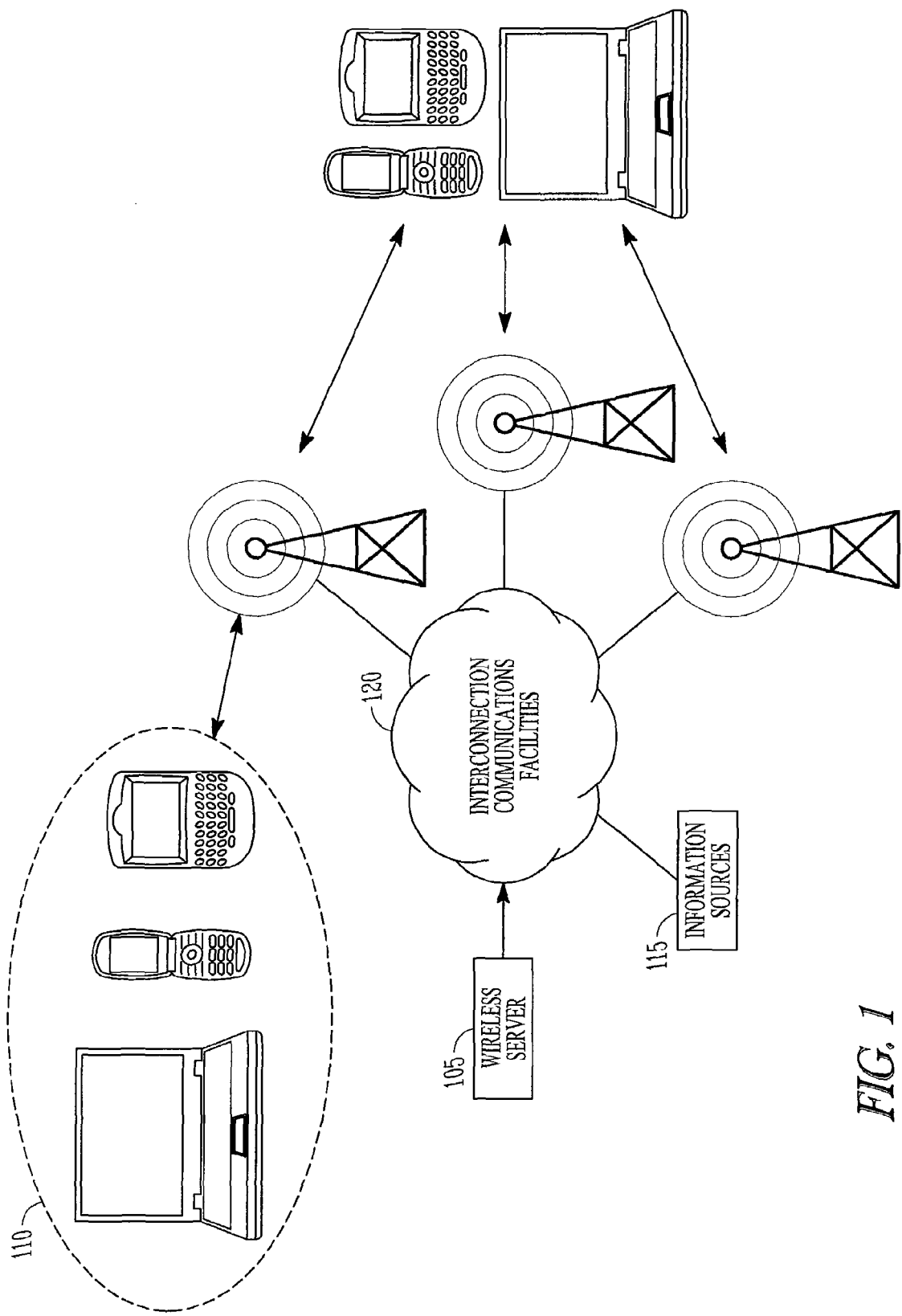
FIG. 1 illustrates an embodiment of an architecture for operation of mobile wireless devices registered in a wireless server, according to various embodiments.

The following detailed description refers to the accompanying drawings that show, by way of illustration, details and embodiments in which the invention may be practiced. These embodiments are described in sufficient detail to enable those skilled in the art to practice embodiments of the invention. Other embodiments may be utilized and structural, logical, and electrical changes may be made. The various embodiments disclosed herein are not necessarily mutually exclusive, as some embodiments can be combined with one or more other embodiments to form new embodiments. The following detailed description is, therefore, not to be taken in a limiting sense.

In various embodiments, informational content can be transferred between a first mobile electronic device and a second mobile electronic device using directed transmission between a first server and a second server. The transfer can be based on a trust relationship between the first mobile electronic device and the second mobile electronic device. The first mobile electronic device can be registered in the first server as a client of the first server and the second mobile electronic device can be registered as a client of the second server. Each apparatus of the group including the first mobile electronic device, the second mobile electronic device, the first server, and the second server can be structured to perform operations within the apparatus for engaging in such transfer of the informational content between the first mobile electronic device and the second mobile electronic device. In various embodiments, these apparatus can be configured for engaging in the transfer of informational content such that the management of the transfer may be conducted with limited user interaction and, in various embodiments, the apparatus may perform various operations essentially autonomously.

By informational content, it is meant information for direct use by a user rather than data exchange between devices operating to accomplish a task not perceived by the user. Informational content can be presented in various forms including, but not limited to, files, data, and media content. A user can access the informational content on electronic apparatus having input/output devices corresponding to the format of the informational content used. For example, media content can be transferred in audio media format, video media format, multi-media format, or other format that provides a presentation to be accessed as information or entertainment or both information and entertainment for use by an individual. In various embodiments, media content is managed in a system. Systems and methods for managing media content may be configured such that the management may be conducted with limited user interaction and, in various embodiments, the system may perform essentially autonomously. Media is a form of general communication, information, or entertainment in society, which is typically intended to be used by a large audience, thought not limited to a large audience. Various media may include, but are not limited to, music, movies, music videos, television shows, interactive applications, audio books, podcasts, games, and other presentations. Each form of media may be referred to as media content or media art. Associated with a item of media art that is stored or processed on an apparatus is a media file, which when operated on by an associated playing device (player) provides an output that can be presented as communication, information, entertainment, other presentations, or combinations thereof for the user.

Systems that manage media content and other informational content can include computers such as a personal computer (PC). A personal computer herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, some form of keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a PC manages media content in relationship to one or more mobile electronic devices. These mobile electronic devices that can play media files and interact with the PC with respect to the management of media content on the mobile electronic device. In various embodiments, the mobile electronic devices include instrumentalities similar to those of the PC to manage the media content on the mobile electronic device, to browse media files in one or more PCs, and to engage with a PC in interactive management of media content on the mobile electronic device, the PC, and on other mobile electronic devices in which the media content may be shared. The mobile electronic device can be a mobile wireless device that includes communication features. Mobile wireless devices may include, but are not limited to, mobile telephones, portable computers, personal digital assistants, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

In various embodiments, a machine-readable medium, such as a non-transitory machine-readable storage medium, stores instructions, which when performed by a machine, cause the machine to perform operations comprising engaging in a transfer of informational content between a first mobile electronic device and a second mobile electronic device using directed transmission between a first server and a second server. The first mobile electronic device can be registered in the first server as a client of the first server and the second mobile electronic device can be registered as a client of the second server. The instructions can include instructions to analysis a set of criteria for the transfer. Analyzing the criteria can includes accessing a matrix of costs or speed of transfer or both, where the matrix has elements dependent upon a mode of transmission and size of data transmission to transfer the informational content between the first mobile electronic device and the second mobile electronic device.

Registration of a mobile electronic device in a server establishes a trust relationship between the mobile electronic device and the server, where the registration provides an establishment of permissions for sharing data upon other mobile electronic devices registered in the same server based on a shared characteristic of the mobile electronic devices. An example of a trust relationship between a mobile wireless device registered as a client of a wireless server is provided with respect to the discussion of FIGS. 1-5.

FIG. 1 illustrates an embodiment of an architecture for operation of mobile wireless devices registered in a wireless server 105. Registration in wireless server 105 allows various forms of data to be shared about various mobile wireless devices registered in wireless server 105. The example architecture includes a wireless server 105 that provides a variety of services to a group 110 of mobile wireless devices. Wireless server 105 includes instrumentality to manage the operation of group 110 of mobile wireless devices under a common criterion or a common set of criteria associated with the registration of these mobile wireless devices in server 105.

Wireless server 105 can control dissemination of data among group 110. In some instances, the data may be shared between one or more of the mobile wireless devices in group 110. In some instances, the information may be shared to less than all the mobile wireless devices in group 110. A privacy status may be used to maintain and regulate the privacy of the data relative to both members of group 110 and entities external to group 110. Wireless server 105 can access information sources 115 using interconnection communication facilities 120. Information sources 115 may include a wide variety of sources that provide informational content in various formats. Information sources 115 may include informational content in an open format without restrictions on what entities may access the informational content. Information sources 115 may include informational content in an open format requiring enrollment by the entities to the informational content without further restrictions. Information sources 115 may include informational content accessible based on a subscription to the informational content. Information sources 115 may include informational content accessible under a privacy condition administered by the corresponding information sources 115.

Data from the informational sources may include, but is not limited to, photographs, documents, music, video, audio transmissions, e-mail, messages, telephonic communications, personalized data, computational data, operational data, and combinations thereof. Personalized data may include, but is not limited to, an individual's personal calendar entries, notes, contacts (names, addresses, phone numbers, e-mail address, etc.), memos, and other data personal to an individual. The informational content may be provided in a variety of electronic formats. Such electronic formats may include file formats having extensions that include, but are not limited to, doc, dot, wpd, txt, xls, pdf, ppt, jpg, jpeg, png, bmp, gif html, htm, zip, tif, tiff, wmf, mp3, and wav.

Interconnection communications facilities 120 may include one or more communication networks that allow transfer of data among wireless server 105, group 110 of mobile wireless devices, information sources 115, and other communication entities accessible in conjunction with interconnection communications facilities 120. Interconnection communications facilities 120 may be configured as a local area network, a wide area network, or combinations thereof. In addition, interconnection communications facilities 120 may be configured to include a private network. Interconnection communications facilities 120 may be realized using one or more transmission media. Such transmission media may include one or more of fiber optics, wired pairs, cable, or wireless media. In an embodiment, wireless server 105 and members of the group 110 of mobile wireless devices may communicate directly without using interconnection communication facilities 120. Interconnection communications facilities 120 allow communication between wireless server 105 and members of group 110 in a wireless infrastructure that includes mobile wireless devices that do not share a common criterion or a common set of criteria with the wireless server 105 and members of group 110, but use the same wireless infrastructure or at least portions of the same wireless infrastructure.

In an embodiment, wireless server 105 and group 110 of mobile wireless devices have an intrinsic relationship from registration of group 110 of mobile wireless devices such that wireless server 105 operates in large part based on the intrinsic relationship with group 110. The intrinsic relationship may be used to define a share group. A share group is two or more entities that share information in which the entities have a trusted relationship. The trusted relationship may be directed to and held by one of the entities of the group. Wireless server 105 may be realized as software for integration into a machine that provides simplified operation of the machine around the core of group 110. Group 110 may be defined by a set of people having a common relationship implementable in wireless server 105. The set of people may range from one to thousands. For group 110 of mobile wireless devices, the intrinsic relationship may be generated by a common use of wireless server 105 in which wireless server 105 shares information among the members of group based on a unique identifier of a user group 110 being a user of wireless server 105. The relationship may be initiated by installing unique identifiers of each member in a storage medium of wireless server 105 as a registration of the members to create a share group.

In an embodiment, communications between a mobile wireless device of group 110 and wireless server 105 can be conducted over a secure communication channel. The secure communication channel may be correlated to the unique identification that establishes the group relationship of the wireless mobile device to the share group of wireless server 105. Wireless server 105 may communicate with the mobile wireless clients over a wireless channel that is secured. The secure channel can be provided using encrypted data for security. In an embodiment, the data may be encrypted using the advanced encryption standard (AES).

In various embodiments, wireless server 105 can be realized as group software installable on an existing machine having a controller, such as one or more processors, and machine-readable medium, such as a non-transitory machine-readable storage medium, to store the instructions of the group software. In some embodiments, wireless server 105 can be realized as a system having hardware and software to execute the functions for the share group defined by wireless server 105 and group 110 of mobile wireless devices. In various embodiments, a simplified user interface (UI) may be provided to execute and operate the group software of wireless server 105.

In various embodiments, wireless server 105 can be used to implement services from a network provider. A network provider provides a user with access to a communication network and typically provides access to information services associated with the provided access to a communication network. Wireless server 105 may be associated with multiple network providers dependent upon the network provider services to which the registered users of wireless server 105 have entered agreements. Wireless server 105 can be in a client-server relationships with a variety of systems and devices, including mobile wireless devices of group 110 and web-based clients. Wireless server 105 serves as a staging area for the dissemination of informational content to one or more mobile wireless clients of a share group of wireless server 105.

Wireless server 105 and mobile wireless devices 110 can operate as a share group having secured communication and secured sharing by means of wireless server 105. Wireless server 105 includes a list of identifiers that uniquely identifies each mobile wireless device of group 110 as clients belonging to a user that is also a user of wireless server 105. Establishing the unique identifiers in wireless server 105 and each corresponding mobile wireless device 110 can define the trust relationship for the share group. The identities of each of the mobile wireless clients may be correlated to its secure remote password (SRP) key. The SRP key may be used for authentication when connecting to a wireless network. The SRP key provides a unique identifier for wireless server 105 and may indicate usage of a secure channel. The SRP keys may be used for registering the wireless server 105 and determining that wireless server 105 has a unique relationship with a wireless client to communicate with a network infrastructure. SRP key also allows an identification of a mobile wireless device as a client of wireless server 105 over a direct plug-in channel or an unsecured Wi-Fi channel. A SRP key can be implemented in any acceptable manner depending on the security needs of the situation. The implementation may range from simple combinations, such as the current date and time, to the use of complex cryptographic algorithms. Simple implementations may be used in environments that are very benign with respect to security. When security concerns are high, complex cryptographic algorithms may be used. Various combinations of security measures may be implemented with the SRP key.

The share group may have several levels for a privacy state. The privacy state may include, but is not limited to, a status as being owned by one user associated with one of mobile wireless devices of group 110, a status as being shared among two or more of mobile wireless clients of group 110 but less than all the mobile wireless devices, a status as being shared among all of mobile wireless devices of group 110, and a status as being shared or accessible by entities outside the group of mobile wireless devices of group 110 in addition to being shared among all of mobile wireless devices 110. A status as being shared or accessible by entities outside the group of mobile wireless clients 110 may include specified entities permitted accessibility.

Figure 2:
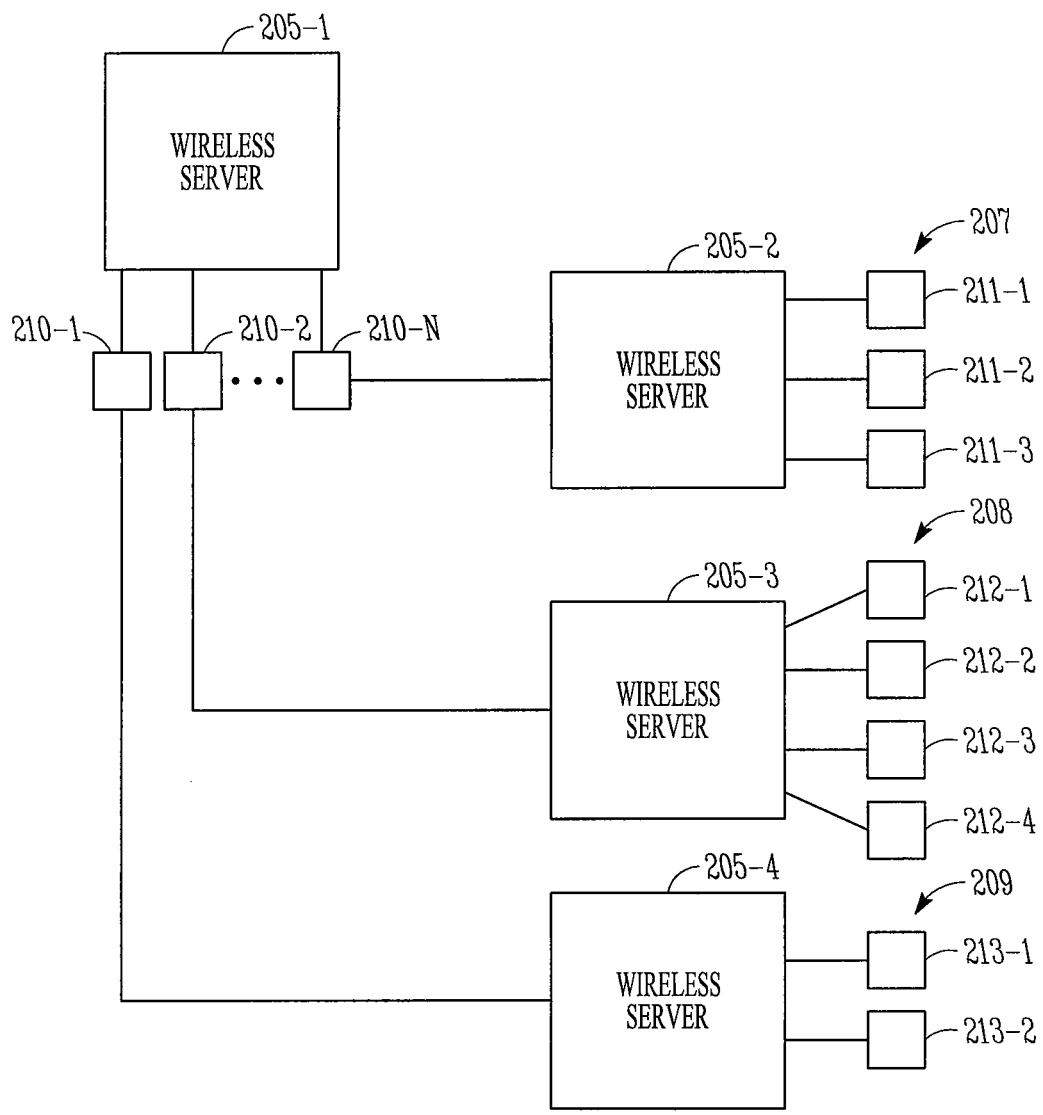
FIG. 2 depicts an embodiment of a wireless architecture in which a relationship between mobile wireless devices as clients of multiple wireless servers is illustrated.

FIG. 2 depicts an embodiment of a wireless architecture in which a relationship between mobile wireless devices as clients of multiple wireless servers is illustrated. Wireless server 205-1 provides wireless services, similar to those services discussed with respect to wireless server 105 of FIG. 1, to the group of mobile wireless devices 210-1, 210-2 . . . 210-N as a primary wireless server for the group. Members of the group may individually belong to another group associated with another wireless server, in which such a wireless server is secondary wireless server. For example, wireless servers 205-2, 205-3, and 205-4 are configured to groups 207, 208, and 209, respectively. Group 207 includes mobile wireless devices 211-1, 211-2, and 211-3. Group 208 includes mobile wireless devices 212-1, 212-2, 212-3, and 212-4. Group 209 includes mobile wireless devices 213-1 and 213-2. Mobile wireless device 210-N may also belong to group 207 in which case wireless server. 205-2 is a secondary wireless server for mobile wireless device 210-N. Mobile wireless device 210-2 may also belong to group 208 in which case wireless server 105-3 is a secondary wireless server for mobile wireless device 210-2. Mobile wireless device 210-1 may also belong to group 209 in which case wireless server 205-4 is a secondary wireless server for mobile wireless device 210-1. In an embodiment, a mobile wireless client can be assigned to a primary wireless server as a group member and can be assigned, as a group member, to multiple secondary wireless servers.

In an embodiment, the functioning of a mobile wireless client with a primary wireless server and with one or more secondary wireless servers can be controlled by the policies of the wireless servers, where the policies of the primary wireless server dominate the policies of the secondary wireless servers. The assignment of a primary wireless server may include a negotiation in which the user of the mobile wireless client agrees to make a specific wireless server its primary wireless server in return for assignment to the group of the specific wireless server. Such negotiation may result in termination of some service features provided by the wireless servers upon the identification of these wireless servers as being secondary. Due to conflicts between wireless servers, a mobile wireless device may be limited in the number of secondary wireless server groups to which it belongs as a registered client.

For pairs of mobile wireless devices in an architecture in which the mobile wireless devices are not registered in the same server, informational content can be transferred between the two mobile wireless devices using directed transmission between servers. The transfer is based on a trust relationship between the two mobile wireless devices. In various embodiments, one of the mobile wireless devices can be registered in one server and the other mobile wireless device can be registered in the other server.

Figure 3:
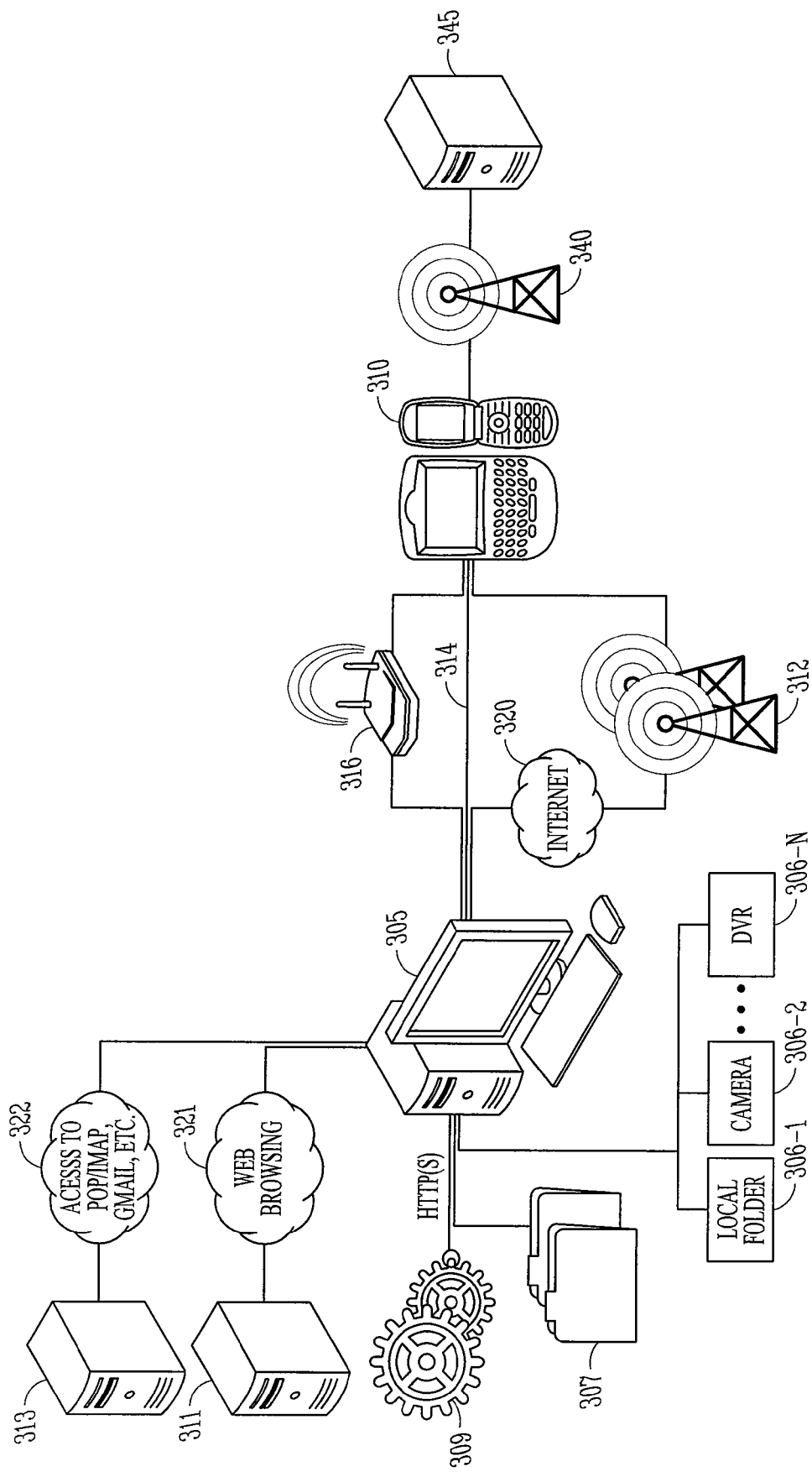
FIG. 3 illustrates a block diagram of features of an architecture for mobile wireless devices registered in a wireless server, according to various embodiments.

FIG. 3 illustrates a block diagram of features of an architecture for mobile wireless devices 310 registered in a wireless server 305, according to various embodiments. The architecture includes a local PC 305 arranged as a wireless server for mobile wireless devices 310 such that the registered mobile wireless devices 310 are clients of local PC 305. Local PC 305 can be configured as a wireless server using software and supporting hardware, where local PC 305 can be realized as a home wireless server or as a small office/home office (SOHO) wireless server. As a home wireless server, local PC 305 provides a mechanism for a family to share informational content and manage operation of mobile wireless devices 310 of the family. As a small office/home office (SOHO) wireless server, local PC 305 provides a mechanism for members of a small business to share business information, which can be provided in a number of different formats, and manage operation of the small business related activities of mobile wireless devices 310.

Mobile wireless devices 310 can be registered in local PC 305 such that mobile wireless devices 310 share various forms of information with each other based on and through registration in local PC 305. Each mobile wireless device is registered on a unique basis with respect to the other mobile wireless devices 310 registered in local PC 305. Local PC 305 includes a list of identifiers that uniquely identifies each of the mobile wireless devices 310 as belonging to a user that is also a user of local PC 305. The identities of each of mobile wireless devices 310 may be correlated to its secure remote password key. The SRP key may be used for authentication when connecting to a wireless network, such as via cellular network 312, where each of mobile wireless devices 310 can operate with local PC 305 over a secured communication channel that is automatically established in initiating a communication session.

The SRP key provides a unique identifier for local PC 305 and may also indicate usage of a secure channel. The SRP keys may be used for registering local PC 305 and determining that local PC 305 has a unique relationship with a mobile wireless device to communicate with a network infrastructure. A SRP key also allows an identification of a mobile wireless device with local PC 305 over a direct plug-in channel, such as universal serial bus (USB) cable 314, or a secured or an unsecured Wi-Fi channel 316. A SRP key can be implemented in any acceptable manner depending on the security needs of the situation. The implementation may range from simple combinations, such as the current date and time, to the use of complex cryptographic algorithms. Simple implementations may be used in environments that are very benign with respect to security. When security concerns are high, complex cryptographic algorithms may be used. Various combinations of security measures may be implemented with the SRP key.

Based on the registration, local PC 305 can act as an administrator for mobile wireless devices 310 registered in local PC 305 to provide managerial functions for mobile wireless devices 310 as a single unique group. Among mobile wireless devices 310, local PC 305 can manage: file transfer folders 307; access to third party applications 309, which may be performed by various combinations of hyper text transfer protocol (http) and hyper text transfer protocol secure (https) or other mechanisms; access to an internet service provider (ISP) 313 for internet message access protocol (IMAP) mail accounts/a post office protocol (POP) system accounts/google mail (GMAIL) accounts, or other e-mail accounts; access to web servers 311, and access to locally controlled devices to the home/SOHO such as, but not limited to, local folders 306-1, camera 306-2 or home/SOHO monitoring equipment, . . . DVRs (digital video recorders) 306-N or other home/SOHO media equipment.

Informational content, which may be shared among mobile wireless devices 310, can include, but is not limited to, photographs, documents, music, video, audio transmissions, e-mail, messages, telephonic communications, personalized data, computational data, operational data, and combinations thereof. Personalized data may include, but is not limited to, an individual's personal calendar entries, notes, contacts (names, addresses, phone numbers, e-mail address, etc.), memos, and other data personal to an individual. The informational content may be provided in a variety of electronic formats. Such electronic formats may include file formats having extensions that include, but are not limited to, doc, dot, wpd, txt, xls, pdf, ppt, jpg, jpeg, png, bmp, gif, html, htm, zip, tif, tiff, wmf, mp3, and wav.

The sharing of information among mobile wireless devices controlled by local PC 305 may have several levels for a privacy state. The privacy state may include, but is not limited to, a status as being owned by one user associated with one of mobile wireless devices 310, a status as being shared among two or more of mobile wireless devices 310 but less than all mobile wireless devices 310, a status as being shared among all of mobile wireless devices 310, and a status as being shared or accessible by entities outside the group of mobile wireless devices 310 in addition to being shared among all of mobile wireless devices 310. A status as being shared or accessible by entities outside the group of mobile wireless devices 310 may include specified entities permitted accessibility.

Local PC 305 can be configured to regulate various flows of informational content and the management of the mobile wireless devices 310 on an autonomous basis according to profiles established in local PC 305 for various ones of mobile wireless devices 310. The profiles can be established according to various policies that control not only the flow of informational content shared among the mobile wireless devices 310, but also the use of individual wireless devices of the group of mobile wireless devices. For instance, with a local home PC 305 configured as a wireless server for mobile wireless devices 310 of family members, the policies can regulate flow of e-mail messages, instant messaging communications, page messages, text communications, and/or telephonic calls of the family. The administrator for such a local home PC 305 can be correlated to one or more of mobile wireless devices 310 assigned to one or more parents. The parents can set the management parameters individually for each of mobile wireless devices 310 of the family directly on local home PC 305 or using a mobile wireless device designated as an administrator to set the parameters in local home PC 305. In a similar manner, an administrator for a SOHO can be correlated to a particular mobile wireless device associated with the manager of the SOHO.

Local PC 305 can provide synchronization of the transfer of informational content among the mobile wireless devices 310. Given a profile established in local PC 305, the acquisition of informational content in local PC 305 can automatically generate a linkage of the informational content to various folders that provide access to the folder content by select ones of mobile wireless devices 310. In addition, users of mobile wireless devices 310 can browse the content of local PC 305 using a browser on mobile wireless devices 310. Users of mobile wireless devices 310 can also conduct web browsing through web servers 311 accessed through local PC 305.

The architecture of FIG. 3 includes a local PC 305 arranged as a wireless server for mobile wireless devices 310, with connectivity to wired networks 320, 321, 322. Wired networks 320, 321, 322 can be arranged as individual networks. Wired networks 320, 321, 322 can be arranged as a network of interconnected computer networks that interchange data using a standardized protocol. Such a network may include the Internet.

A mobile wireless device in the group of mobile wireless devices 310 can also be registered in a business server 345, separate from local PC 305, in which the mobile wireless device communicates with business server 345 over cellular network 340. Interaction of the mobile wireless device and business server 345 can be regulated under policies associated with business server 345. For the given mobile wireless device, one of the sets of policies associated with local PC 305 and business server 345 may function as the dominant policy for operating the given mobile wireless device. The status of a dominate policy can be changed between the two sets of policies.

Mobile wireless devices 310 can exchange operational parameters and informational content with local PC 305 over various mediums. A communication session between local PC 305 and one or more of mobile wireless device 310 can be conducted over cellular network 312. A communication session between local PC 305 and an individual mobile wireless device 310 can be conducted USB cable 314. A communication session between local PC 305 and one or more of mobile wireless device 310 can be conducted over a Wi-Fi network 316. Wi-Fi network 316 may be a home Wi-Fi network. Wi-Fi network 316 may be a Wi-Fi network coupled to the Internet, where such a Wi-Fi network can be accessed by a mobile wireless device.

Figure 4A:
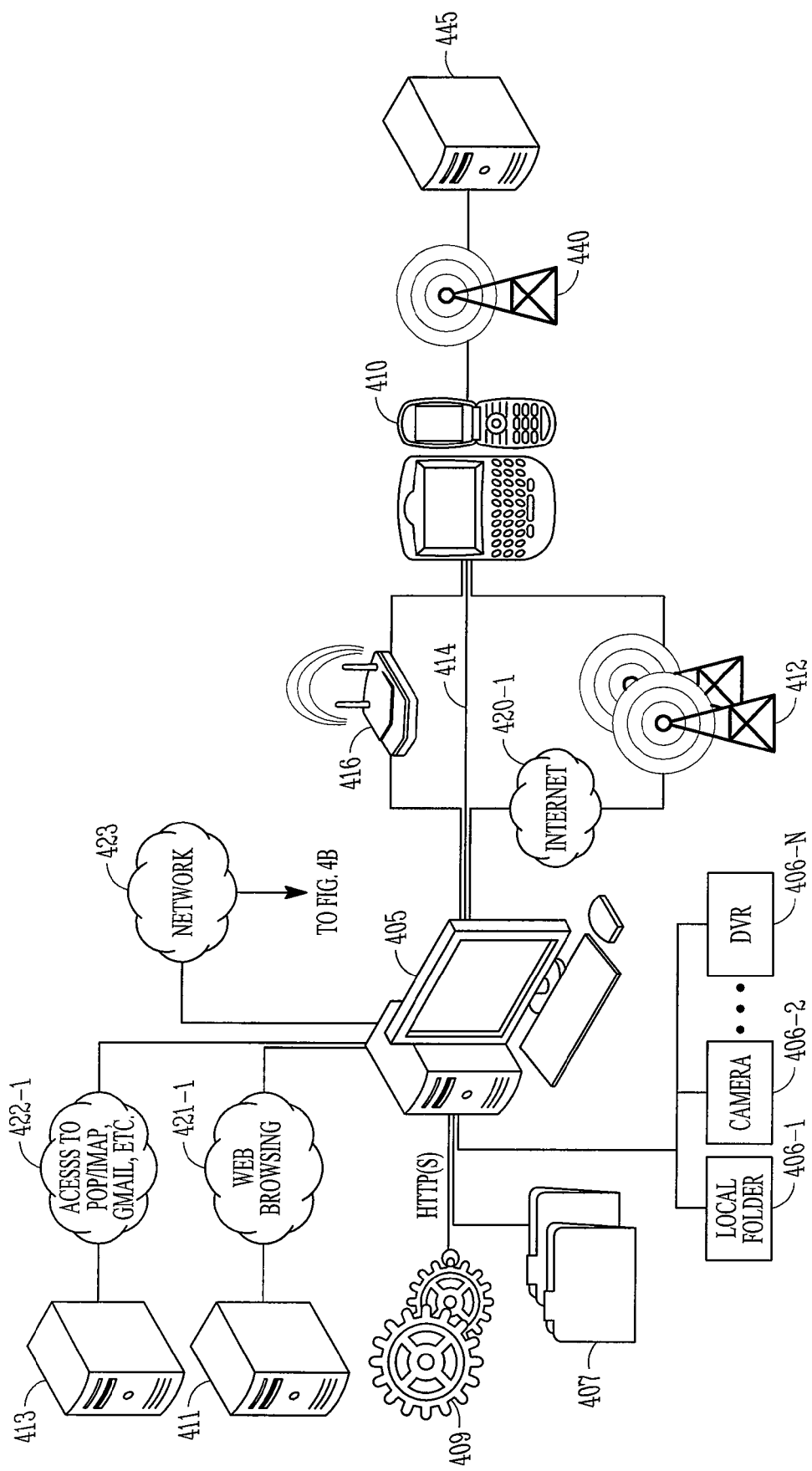
FIGS. 4A and 4B illustrate a block diagram of features of an architecture for mobile wireless devices registered in different wireless servers, according to various embodiments.
Figure 4B:
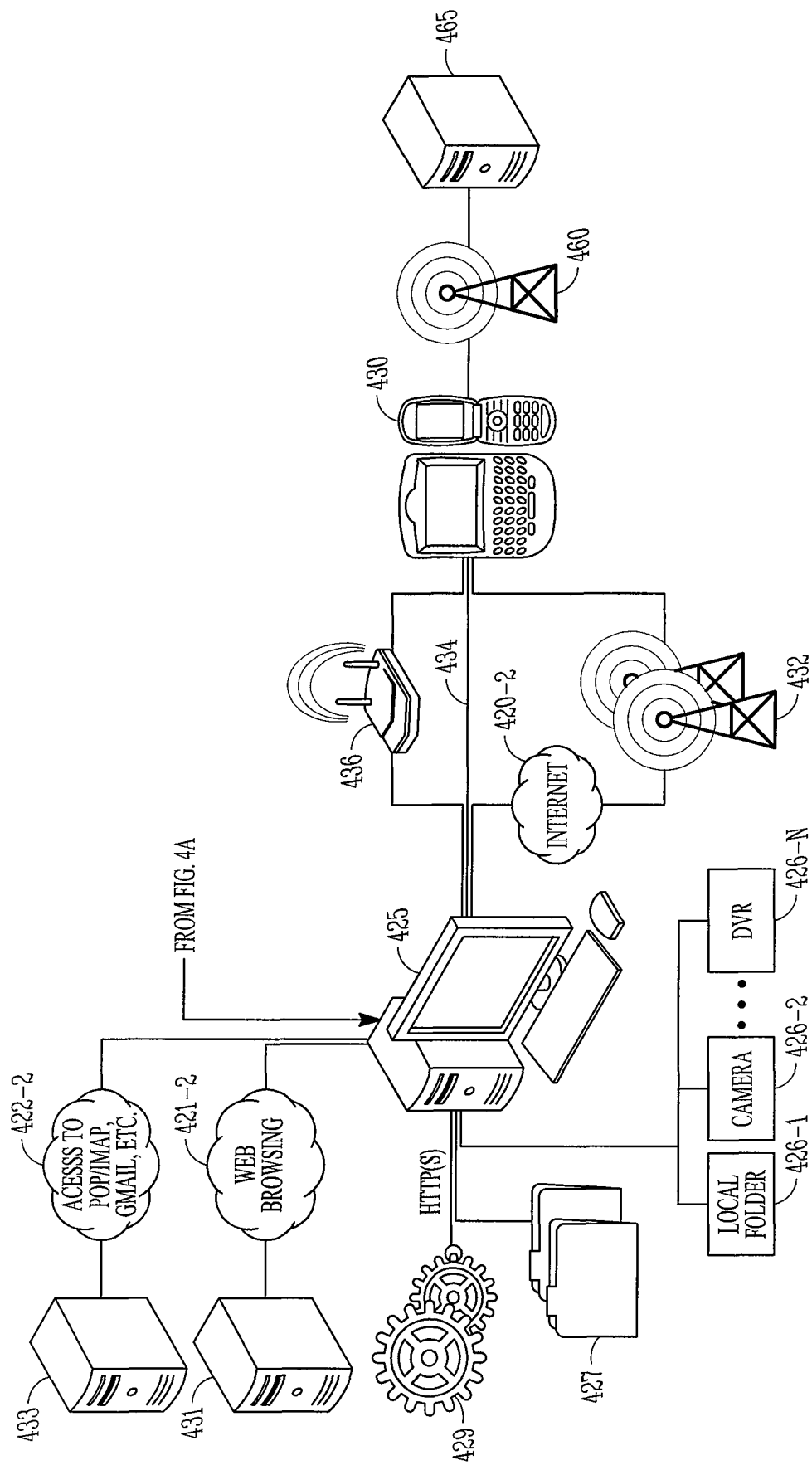

FIGS. 4A and 4B illustrate a block diagram of features of an architecture for mobile wireless devices registered in different wireless servers. In various embodiments, mobile wireless devices 410 are registered in local PC 405 according to a share arrangement among the wireless devices 410 and local PC 405. Local PC 405 can be configured as a wireless server arranged as a home wireless server or a SOHO wireless server, for example. The arrangement of mobile wireless devices 410 and local PC 405 can be implemented with the functions and characteristics similar to or identical to the functional arrangement of mobile wireless devices 310 and local PC 305 as discussed with respect to the architecture of FIG. 3.

For example, based on the registration, local PC 405 can act as an administrator for mobile wireless devices 410 registered in local PC 405 to provide managerial functions for mobile wireless devices 410 as a single unique group. Among mobile wireless devices 410, local PC 405 can manage: file transfer folders 407; access to third party applications 409, which may be performed by various combinations of hyper text transfer protocol (http) and hyper text transfer protocol secure (https) or other mechanisms; access to an internet service provider (ISP) 413 for internet message access protocol (IMAP) mail accounts/a post office protocol (POP) system accounts/google mail (GMAIL) accounts, or other e-mail accounts; access to web servers 411, and access to locally controlled devices to the home/SOHO such as, but not limited to, local folders 406-1, camera 406-2 or home/SOHO monitoring equipment, . . . DVRs (digital video recorders) 406-N or other home/SOHO media equipment.

In addition, the architecture of FIGS. 4A and 4B includes local PC 405 arranged as a wireless server for mobile wireless devices 410, with connectivity to wired networks 420-1, 421-1, 422-1, and 423. Wired networks 420-1, 421-1, 422-1, and 423 can be arranged as individual networks. Wired networks 420-1, 421-1, 422-1, and 423 can be arranged as a network of interconnected computer networks that interchange data using a standardized protocol. Such a network may include the Internet. Via cellular network 440, a mobile wireless device in the group of mobile wireless devices 410 can also be registered in a business server 445, separate from local PC 405.

Mobile wireless devices 410 can exchange operational parameters and informational content with local PC 405 over various mediums. A communication session between local PC 405 and one or more of mobile wireless device 410 can be conducted over cellular network 412. A communication session between local PC 405 and an individual mobile wireless device 410 can be conducted using USB cable 414. A communication session between local PC 405 and one or more of mobile wireless device 410 can be conducted over a Wi-Fi network 416. Wi-Fi network 416 may be a home Wi-Fi network. Wi-Fi network 416 may be a Wi-Fi network coupled to the Internet, where such a Wi-Fi network can be accessed by a mobile wireless device.

Mobile wireless devices 430 are registered in local PC 425 according to a share arrangement among the wireless devices 430 and local PC 425. Local PC 425 can be configured as a wireless server arranged as a home wireless server or a SOHO wireless server, for example. The arrangement of mobile wireless devices 430 and local PC 425 can be realized to have the functions and characteristics similar to or identical to the functional arrangement of mobile wireless devices 310 and local PC 305 as discussed with respect to the architecture of FIG. 3.

For example, based on the registration, local PC 425 can act as an administrator for mobile wireless devices 430 registered in local PC 425 to provide managerial functions for mobile wireless devices 430 as a single unique group. Among mobile wireless devices 430, local PC 425 can manage: file transfer folders 427; access to third party applications 429, which may be performed by various combinations of hyper text transfer protocol (http) and hyper text transfer protocol secure (https) or other mechanisms; access to an internet service provider (ISP) 423 for internet message access protocol (IMAP) mail accounts/a post office protocol (POP) system accounts/google mail (GMAIL) accounts, or other e-mail accounts; access to web servers 421, and access to locally controlled devices to the home/SOHO such as, but not limited to, local folders 426-1, camera 426-2 or home/SOHO monitoring equipment, . . . DVRs (digital video recorders) 426-N or other home/SOHO media equipment.

In addition, the architecture of FIGS. 4A and 4B includes local PC 425 arranged as a wireless server for mobile wireless devices 430, with connectivity to wired networks 420-2, 421-2, 422-2, and 423. Wired networks 420-2, 421-2, 422-2, and 423 can be arranged as individual networks. Wired networks 420-2, 421-2, and 422-2 may be common to respective wired networks 420-1, 421-1, and 422-1. Wired networks 420-2, 421-2, 422-2, and 423 can be arranged as a network of interconnected computer networks that interchange data using a standardized protocol. Such a network may include the Internet. Via cellular network 460, a mobile wireless device in the group of mobile wireless devices 430 can also be registered in a business server 465, separate from local PC 425.

Mobile wireless devices 430 can exchange operational parameters and informational content with local PC 425 over various mediums. A communication session between local PC 425 and one or more of mobile wireless device 430 can be conducted over cellular network 432. A communication session between local PC 425 and an individual mobile wireless device 430 can be conducted using USB cable 434. A communication session between local PC 405 and one or more of mobile wireless device 410 can be conducted over a Wi-Fi network 436. Wi-Fi network 436 may be a home Wi-Fi network. Wi-Fi network 436 may be a Wi-Fi network coupled to the Internet, where such a Wi-Fi network can be accessed by a mobile wireless device.

In various embodiments, one or more of mobile wireless devices 410 are not registered in local PC 425 and one or more of mobile wireless devices 430 are not registered in local PC 405. However, informational content can be shared between two mobile wireless devices that are not registered with a share arrangement in the same local wireless server. The informational content can be shared using the registration arrangement of each mobile wireless device with its own local PC with transfer of the informational content provided by directed communication between the corresponding local PCs. For example, a mobile wireless device of the group 410 can share informational content with a mobile wireless device of the group 430 by initiating transfer of the informational content from local PC 405 to local PC 425 over network 423, where at local PC 425 the informational content is available to the mobile wireless device of the group 430 based on its profile in local PC 425. In a similar manner, a mobile wireless device of the group 430 can share informational content with a mobile wireless device of the group 410. With network 423 being the internet, the transfer can be conducted in a cost efficient, time efficient convenient manner.

Figure 5:
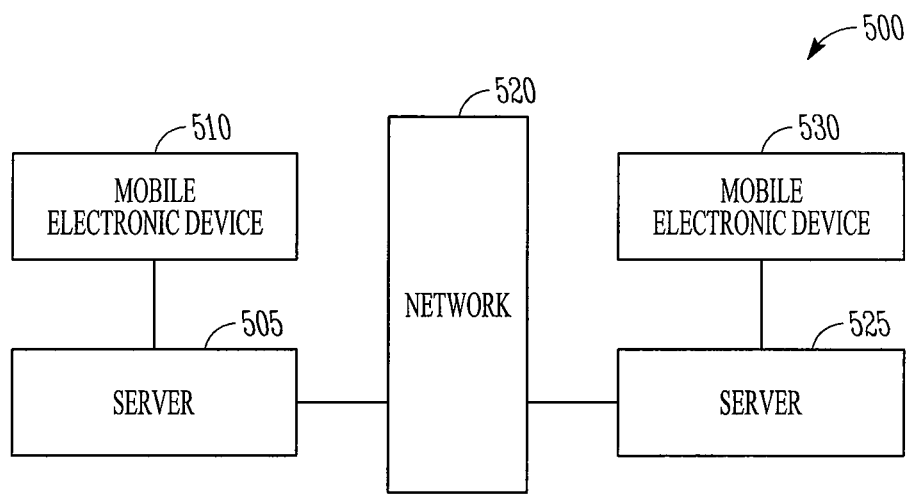
FIG. 5 illustrates a block diagram of features of an architecture arranged for device-to-device transferal of informational content, according to various embodiments.

FIG. 5 illustrates a block diagram of features of an architecture arranged for device-to-device transferal of informational content, according to various embodiments. Architecture 500 shows mobile electronic device 510 interrelated with server 505 and mobile electronic device 530 interrelated with server 525. The interrelation of server 505 with mobile electronic device 510 can include the registration of mobile electronic device 510 in server 505 as a client of server 505. The interrelation of server 525 with mobile electronic device 530 can include the registration of mobile electronic device 530 in server 525 as a client of server 525. The registration relationship between a mobile electronic device and its server allows a user of the mobile electronic device to manage properties of the mobile electronic device through accessing and operating applications on the server. Such a server can be configured in a PC to provide enhanced user control of its registered mobile electronic devices. The registration relationship also allows a user of a mobile electronic device to access applications, data, and informational content on the server or through the server in which it is registered. In various embodiments, mobile electronic devices 510 and 530 are mobile wireless devices and servers 505 and 525 are wireless servers.

Servers 505 and 525 can engage in a directed transmission via network 520. By directed transmission of two servers, it is meant that the two servers establish communication with each other such that the two servers are parties to the transmission rather than being effectively only passive relays. Network 520 can be a local area network, a wide area network, or combinations thereof. Servers 505 and 525 may use the Internet as network 520. Using directed transmission, such as through the Internet, the transfer process can be streamlined. This streamlining mechanism allows the transferal process to be completed without using e-mail transferal or Bluetooth transferal. Bluetooth transferal is only available when both parties are available and in close proximity. Email transferal includes application of a user's data plan and may include performing the download at a time that may not be convenient.

The capability of directed transmission between servers 505 and 525 and the registration relationship of mobile electronic device 510 with server 505 and mobile electronic device 530 with server 525 provides an efficient mechanism for managing the transferal of informational content between mobile electronic device 510 and mobile electronic device 530. The transferal management can be regulated such that the time of transmission can be leveraged with transmission method. This leverage allows for the combined enhancement of speed of access to data, the reduction of financial cost, and the flexibility of access to the information. The transmission methods can be analyzed with respect to transmission mechanisms to move data off and onto a mobile electronic device, where the transmission mechanisms include, but are not limited to, cellular wireless, Wi-Fi, and USB (Universal Serial Bus). Typically, cellular wireless includes a wide area wireless network and Wi-Fi includes a local area wireless network. USB is a serial bus standard to interface devices. A USB connection, for example, can interface a device with a computer. A USB mechanism can be realized as a wired connection or as a wireless connection over relatively short distances.

Selection of the transport from the mobile electronic device based on the data size of the informational content provides for leveraged management of data transferal. The rate of transfer increases going from the cellular wireless mechanism to the Wi-Fi mechanism to the USB mechanism. With respect to cost, data transmission is typically cheaper for USB transferal than for cellular wireless transferal. Additionally, data transmission is typically cheaper over a Wi-Fi mechanism than over cellular wireless, where the cost of a cellular wireless transmission may be a function of a data plan from the service provider for the cellular wireless network. Typically, cellular wireless, Wi-Fi, and USB, provide for decreasing financial cost in the order listed. However, data transferal data to a mobile electronic device from its associated server via USB lacks flexibility, since such transferal is accomplished with the mobile electronic device near to the server. A Wi-Fi mechanism provides additional freedom of operation, but transferal is based on proximity to access point of the Wi-Fi network. Cellular wireless provides the most flexibility when in a region of cellular coverage.

In various embodiments, a user of a mobile electronic device can set certain preferred times of transfer or criteria for transfer based on the registration relationship with its associated server such that transmission time can be leveraged with transmission method to take into account one or more variations in speed of transmission, flexibility, cost, and cost among the modes of transmission. A user can set a particular time of day for transferal from the user's mobile electronic device to one of its corresponding servers in which the mobile electronic device is registered. For example, a particular time can be set based on the user's perceived knowledge how the time of day affects transmission, based on relative costs associated with the mode of transmission, and based on the user's priority for making the transferal.

In various embodiments, a variety of factors for transferal of informational content can be analyzed in a server such as server 505 or server 525. Such factors may include the data size of informational content to be transferred, the modes of transmission available between the server and its mobile electronic device, the speed of the transferal relative to data size, the cost associated with the mode of transmission, user preferences, and the priority assigned to the transferal of the informational content from the mobile electronic device to another mobile electronic device registered in another server to which directed transmission can be facilitated. The result of the analysis in the server can be sent from the server to its registered mobile electronic device, where the analysis can include a recommended time as the relative best time to perform the transfer from the electronic mobile device to its associated server. For example, based on a matrix of costs for each transmission option the server can select the lowest cost mechanism. The matrix of costs can be stored on the server and updated with changes to the parameters in the matrix. Alternatively, depending on the urgency/priority of a download and the cost of transfer, the server may generate a recommendation of a specific time at which to download informational content to the mobile electronic device or upload informational content from mobile electronic device to the server. For example, if informational content is identified as being urgent, the download can be made while in cellular wireless coverage regardless of the cost. In another instance, if the file transfer is not urgent, transferal could potentially wait until the electronic device is within a Wi-Fi access point or at the server for USB transferal.

In various embodiments, a set of transferal-related parameters can be analyzed for transfer of informational content between mobile electronic device 510 and mobile electronic device 530 using directed transmission between server 505 and server 525 taking parameters for each apparatus into consideration. The analysis can provide for a relatively low cost, fastest, just-in-time transfer between mobile electronic device 510 and mobile electronic device 530 by providing a relative local optimization between the four elements: mobile electronic device 510, server 505, server 525, and mobile electronic device 530. Such a process can include analyzing characteristics of the transfer with respect to three transfer segments. The three transfer segments can be partitioned as a segment transferring the informational content from the mobile electronic device 510 to server 505, a segment transferring the informational content from server 505 to server 525, a segment transferring the informational content from server 525 to mobile electronic device 530. Transfer initiation for a transfer segment of the three transfer segments can be scheduled based on criteria that include transfer characteristics of the transfer segment or user preference or both transfer segment and user preference.

Scheduling transferal for the segment transferring the informational content from mobile electronic device 510 to server 505 can be based on an analysis of parameters including modes of transmission from mobile electronic device 510 to server 505, a data size of the informational content, a correlation between data size and speed of transfer for each mode of transmission, user preference, and a priority for the transfer of the informational content from mobile electronic device 510 to mobile electronic device 530. Likewise, scheduling transferal for the segment transferring the informational content from server 525 to mobile electronic device 530 can be based on an analysis of parameters including modes of transmission from server 525 to mobile electronic device 530, a data size of the informational content, a correlation between data size and speed of transfer for each mode of transmission, user preference, and a priority for the transfer of the informational content from mobile electronic device 510 to mobile electronic device 530.

Scheduling transferal for the segment transferring the informational content from server 505 to server 525 can be based the available networks that can be used as network 520. Using the Internet as network 520, transmission costs associated with wireless network providers can be avoided. In addition, use of the Internet should essentially not incur speed penalties.

The analysis of these three segments for the transfer of the informational content can provide parameters that can be set to reduce the time that a service sends the informational content. The analysis can also provide parameters that can be set to substantially reduce bandwidth charges for one or more of the individuals corresponding to the transfer.

Given two mobile electronic devices, connected to two servers in a trust relationship, a trust relationship between each mobile electronic device and its corresponding server enables a cost effective mechanism for transferring data, files, media, or various combinations thereof to and from each mobile electronic device and between the mobile electronic devices. Data transferal between mobile electronic devices using transferal between their corresponding servers can use a communication medium that has periodic flat rate costs, such as flat rate monthly Internet charges. The use of such a communication medium allows for the avoidance of relatively expensive data plan charges of wireless service providers. Furthermore, the use of the two servers allows users to schedule when they want to upload data and when they want to download data.

In an example embodiment, using the example devices of FIG. 5, one or more files are marked in mobile electronic device 510 for transferal to mobile electronic device 530. Marking of these files can be realized in various ways. These files for transferal may be stored on mobile electronic device 510 and flagged for transferal. These files for transferal may be stored on server 505 in which mobile electronic device 510 is registered with identification of these files in a listing stored in mobile electronic device 510, where the files to be transferred are flagged in the listing in mobile electronic device 510. These files for transferal may be stored on server 505 and flagged in server 505 from mobile electronic device 510 during a browse of server 505 conducted using mobile electronic device 510.

Selection of mobile electronic device 530 as the destination user can be realized by selecting the destination user in an address book of mobile electronic device 510. A user interface of mobile electronic device 510 can provide the address book in terms of mobile electronic device identities or in terms of the names or other identifications of the users of the mobile electronic device. A database of mobile electronic device 510 can be used to correlate the mobile electronic devices and corresponding users for the address book. Once the destination user is selected, a personal identification number (PIN) of the destination user's device is accessed from the database of mobile electronic device 510. The PIN is used to uniquely identify the destination user's device and can be maintained as a secret shared between mobile electronic device 510 and mobile electronic device 530. The unique identification is not limited to numerics but may include other forms of identification that can be electronically stored such as alphabetic characters and alphanumeric representations. These unique identifications may also be stored in servers 505 and 525 that are in a trust relationship with mobile electronic devices 510 and 530.

Based on a profile setting on server 505 in which the sending mobile electronic device, which in this example is mobile electronic device 505, is registered, the upload of the one or more files from mobile electronic device 510 to server 505 can be selected to occur when mobile electronic device 510 is connected to server 505 via USB, via Wi-Fi, or via Cellular. On mobile electronic device 510, after actuating an indication for transfer, such as "clicking send" to send the files, the transmission of the files is queued until the selected connection is available. In addition, the profile can include a time-based setting such as, for example, only upload after 6 pm, which may correspond to the time when cheaper data rates begin for the mode of transmission selected. The upload can be scheduled based on the transmission medium to be used, such as USB, Wi-Fi, or cellular wireless, for example.

Once the one or more files are uploaded from mobile electronic device 510 to server 505, the files can be sent over the internet to server 525. Upon arrival of the files at server 525, a notification, for example an email notification, can be sent to the intended recipient mobile electronic device, which in this example is mobile electronic device 530, to inform the user of mobile electronic device 530 that there are one or more files waiting for the user in server 525. Based on the profile settings for mobile electronic device 530, which can be stored in server 525, the one or more files can be downloaded from server 525 to mobile electronic device 530. The parameters that can be set in the profile for mobile electronic device 530 can be similar to the profile settings for mobile electronic device 510. The settings for the parameters for mobile electronic device 530 may vary with respect to the settings for the parameters for mobile electronic device 510, since these devices have share relationships with different servers and the policies for mobile electronic devices associated with these different servers may differ. For example, while the profile settings for mobile electronic device 510 may provide for transferring a set of files to mobile electronic device 530, the profile settings for mobile electronic device 530 may provide for downloading only a portion of the transferred set from server 525 to mobile electronic device 530. The download can be scheduled based on the transmission medium to be used, such as USB, Wi-Fi, or cellular wireless, for example.

Figure 6:
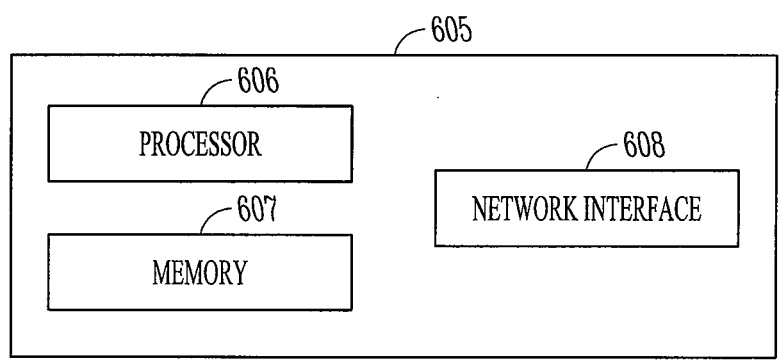
FIG. 6 shows a block diagram of features of an embodiment of a server that can be used in architectures similar to the architecture of FIGS. 4A and 4B and the architecture of FIG. 5.

FIG. 6 shows a block diagram of features of an embodiment of a server 605 that can be used in architectures similar to the architecture of FIGS. 4A and 4B and architecture 500 of FIG. 5. Server 605 can include one or more processors 606, memory 607 operatively coupled to one or more processors 606, and a network interface 608. Memory 607 can be configured to store instructions to engage in a transfer of informational content between a first mobile electronic device and a second mobile electronic device using directed transmission between server 605 and another server. The first mobile electronic device can be registered in server 605 as a client of server 605 and the second mobile electronic device can be registered as a client of the other server. Memory 607 is a form of machine-readable medium that stores instructions. Memory 607 is not limited to any type of machine-readable medium. Network interface 608 is arranged to operatively couple to a network to implement at least directed transmission with the other server. Network interface 608 can be configured to be operable with the Internet to conduct directed transmission to and from the other server.

In various embodiments, server 605 includes a machine-readable medium, such as a non-transitory machine-readable storage medium, that stores instructions, which when performed by server 605, cause server 605 to operate as the first server associated with initiating a transfer of informational content from a transferring mobile electronic device. In addition, server 605 includes a machine-readable medium, such as a non-transitory machine-readable storage medium, that stores instructions, which when performed by server 605, cause server 605 to operate as the second server associated with a mobile electronic device that is the recipient of a transfer of informational content. Alternatively, server 605 may include machine-readable medium, such as a non-transitory machine-readable storage medium, that stores instructions, which when performed by server 605, cause server 605 to operate as the first server or the second server.

Figure 7:
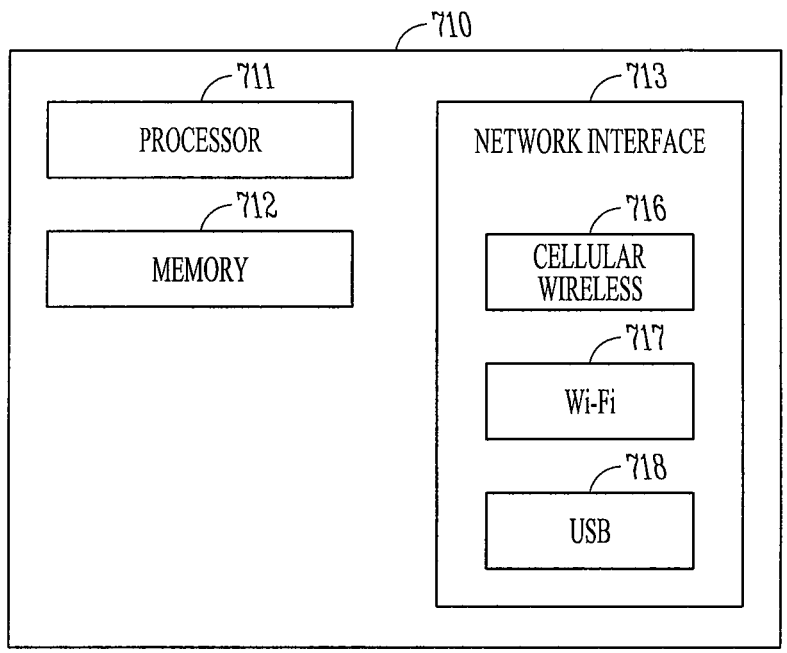
FIG. 7 shows a block diagram of features of an embodiment of a mobile electronic that can be used in architectures similar to the architecture of FIGS. 4A and 4B and the architecture of FIG. 5.

FIG. 7 shows a block diagram of features of an embodiment of a mobile electronic 710 that can be used in architectures similar to the architecture of FIGS. 4A and 4B and architecture 500 of FIG. 5. Mobile electronic device 710 can include one or more processors 711, memory 712 responsive to the one or more processors 711, and a transmission interface 713. Memory 712 can be arranged to store instructions to engage in a transfer of informational content with another mobile electronic device using directed transmission between a first server and a second server. Mobile electronic device 710 can be registered in the first server as a client of the first server and the other mobile electronic device can be registered as a client of the second server. Memory 712 is not limited to any type of machine-readable medium. Transmission interface 713 is a responsive to execution of the instructions stored in memory 712 to transmit the informational content. Transmission interface 713 can be configured to be compatible with one of more modes of transmission selected from of cellular wireless 716, Wi-Fi 717, and USB 718.

In various embodiments, mobile electronic device 710 includes a machine-readable medium, such as a non-transitory machine-readable storage medium, that stores instructions, which when performed by mobile electronic device 710, cause mobile electronic device 710 to operate as a mobile electronic device 710 that initiates transfer of the informational content. In addition, mobile electronic device 710 includes a machine-readable medium, such as a non-transitory machine-readable storage medium, that stores instructions, which when performed by mobile electronic device 710, cause mobile electronic device 710 to operate as a mobile electronic device 710 that is the recipient of the informational content. Alternatively, mobile electronic device 710 may include machine-readable medium, such as a non-transitory machine-readable storage medium, that stores instructions, which when performed by mobile electronic device 710, cause mobile electronic device 710 to operate as the transferring mobile electronic device or the receiving mobile electronic device.

Figure 8:
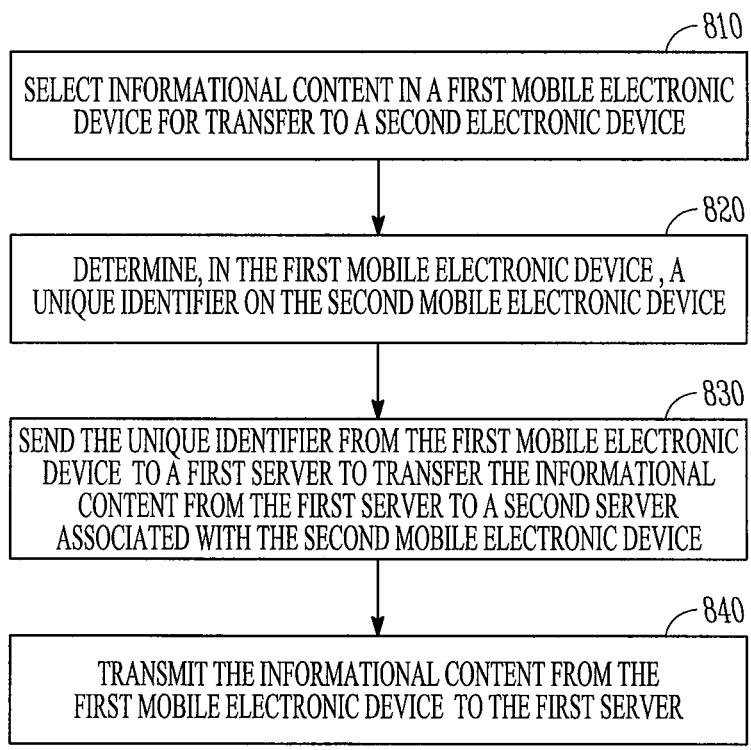
FIG. 8 illustrates features of a method for transferring informational content between two mobile electronic devices using directed transmission between two servers, according to various embodiments.

FIG. 8 illustrates features of a method for transferring informational content between two mobile electronic devices using directed transmission between two servers, according to various embodiments. These features illustrate operations of a mobile electronic devices initiating the transfer.

At 810, informational content is selected in the first mobile electronic device for transfer to a second mobile electronic device. The selection of informational content can include select of informational content that resides on the first mobile electronic device. Alternatively, the selection of informational content can include selection of informational content that resides on a first server in which the first mobile electronic device is registered. Selection of informational content in the first server can be realized by browsing the first server from the first mobile electronic device and selecting the informational content in the first server. The selection of the informational content in the first server can also be recorded in the first mobile electronic device. The selection of the identification of the informational content can be recorded in the first mobile electronic device and sent to the first server.

At 820, a unique identifier of the second mobile electronic device is determined in the first mobile electronic device. The unique identifier is associated with transfers from the first mobile electronic device to the second mobile electronic device. In various embodiments, the unique identifier of the identified second mobile electronic device is maintained in a database. Data with respect to the second mobile electronic device maintained in a database of the first mobile electronic device may include, but is not limited to, identification of the user of second mobile electronic device as a trusted user such that transferals are unlimited or as a restricted user with whom to transfer informational content. Alternatively, the unique identifier of a selected recipient and the set of properties associated with the selected recipient can be maintained in the first server.

At 830, the unique identifier is sent from the first mobile electronic device to a first server to transfer of the informational content from the first server to a second server associated with the second mobile electronic device. The first mobile electronic device can be registered in the first server as a client of the first server and the second mobile electronic device can be registered in the second server as a client of the second server. If the unique identifier of the second mobile electronic device is stored in the first server related to a name of the second mobile electronic device or other similar identification, the name of the second mobile electronic device can be sent to the first server and the first server can determine the unique identifier of the second mobile electronic device.

At 840, the informational content is transmitted from the first mobile electronic device to the first server. Initiating transfer of the informational content to the first server can be based on criteria for transmission from the first mobile electronic device to the first server. The criteria can be based on a correlation between time of transmission and an analysis of one or more parameters of a parameter set, where the parameter set includes modes of transmission and a data size for transferring the informational content. Other parameters can include a priority for the transfer of the informational content from the first mobile electronic device to the second mobile electronic device, and user preference. The correlation and the analysis can be performed in the first mobile electronic device. Alternatively, the correlation and the analysis can be performed in the first server with the results sent to the first mobile electronic device. Initiating the transfer of the informational content can be based on a time set by a user of the first mobile electronic device. Parameters may be set to limit how far in the future to which the time for initiating transfer can be set.

In various embodiments, with the informational content on the first server, only the identity of the informational content is transmitted to the first server or selected in the first server. With the content local to the first server, the upload from the first mobile electronic device can be avoided providing savings in time for transmission to the first server and possible savings of the cost of transmission.

The various operations performed by the first mobile electron device can be performed by execution of instructions stored in a machine-readable medium. The form of machine-readable medium is not limited to any one type of machine-readable medium, but can be any machine-readable medium, such as a non-transitory machine-readable storage medium, that can be implemented in a mobile electronic device. Such a mobile electronic device can be configured similar to the mobile electronic devices discussed with respect to FIGS. 1-5, 7, and 8-13.

Figure 9:
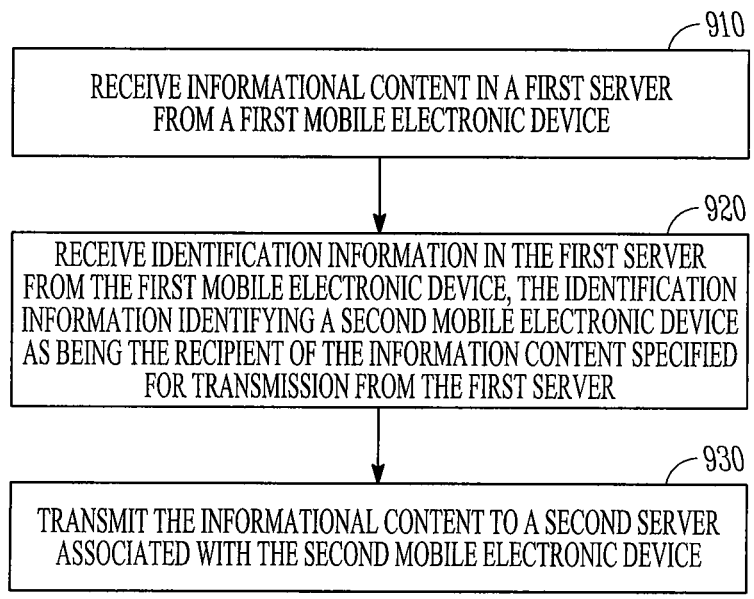
FIG. 9 illustrates features of a method for transferring informational content between two mobile electronic devices using directed transmission between two servers, according to various embodiments.

FIG. 9 illustrates features of a method for transferring informational content between two mobile electronic devices using directed transmission between two servers, according to various embodiments. The features illustrate operations of a server associated with the mobile electronic device initiating the transfer. The mobile electronic device can be registered in the server.

At 910, informational content is received in a first server from a first mobile electronic device. The first mobile electronic device can be registered as a client in the first server. Receiving the informational content in the first server from the first mobile electronic device can be based on criteria for transmission from the first mobile electronic device to the first server. The criteria can include a correlation between time of transmission and an analysis of one or more parameters of a parameter set. The parameter set can include modes of transmission and a data size for transferring the informational content. The modes of transmission can include one or more of cellular wireless, Wi-Fi, USB, or other modes of transmission. Other parameters can include a priority for the transfer of the informational content from the first mobile electronic device to the second mobile electronic device, and user preference.

Prior to receiving the informational content, the criteria for transmission from the first mobile electronic device to the first server can be analyzed in the first server. Based on the analysis of the criteria, a recommended time for sending the informational content to the first server from the first mobile electronic device can be determined. This recommended time can be sent to the first mobile electronic device. The user of the first mobile electronic device can view the recommended time and accept or reject the recommended time. In various embodiments, the recommended time is set as the default time for initiating transferal unless the recommended time is affirmatively rejected.

At 920, identification information is received in the first server from the first mobile electronic device. The identification information identifies a second mobile electronic device as being the recipient of the informational content specified for transmission from the first server. The identification information includes a unique identifier of the second mobile electronic device.

At 930, the informational content is transmitted to a second server associated with the second mobile electronic device. The second mobile electronic device can be registered in the second server. The informational content can be transmitted through a network interface of the first server operable with the Internet. The informational content can be sent over other networks.

Alternatively, the first server can send an identification of the information content to be transferred to the second server. If the second server contains the informational content, the second server can communicate the presence of the information content back to the first server so that the first server can refrain from sending the informational content. The informational content on the second server may belong to a user other than the user of the second mobile electronic device. In such a case, the second server can record the relationship of the informational content with the second mobile electronic device as being from the first mobile electronic device.

The various operations performed by the first server can be performed by execution of instructions stored in a machine-readable medium. The form of machine-readable medium is not limited to any one type of machine-readable medium, but can be any machine-readable medium, such as a non-transitory machine-readable storage medium, that can be implemented in a server. Such a server can be configured similar to the servers discussed with respect to of FIGS. 1-6 and 8-13.

Figure 10:
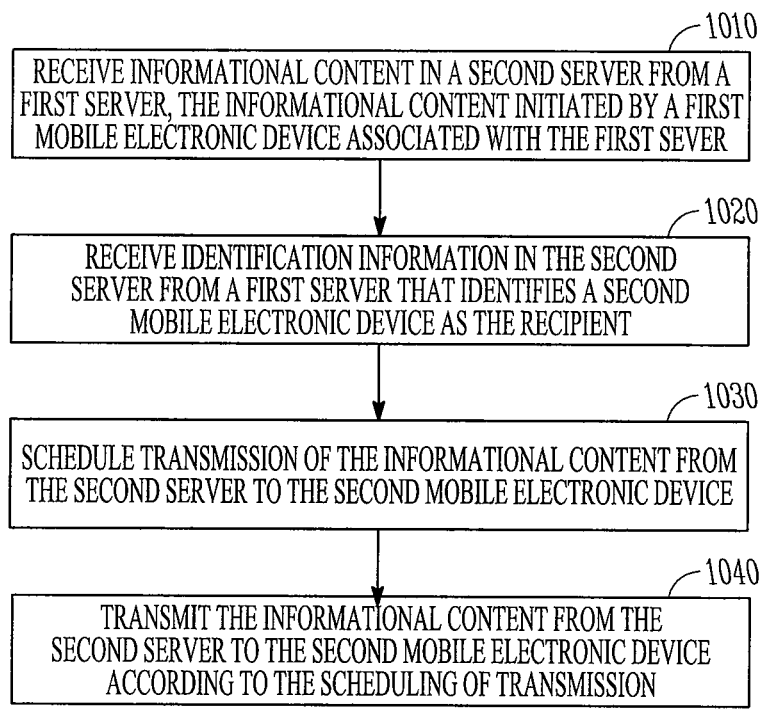
FIG. 10 illustrates features of a method for transferring informational content between two mobile electronic devices using directed transmission between two servers, according to various embodiments.

FIG. 10 illustrates features of a method for transferring informational content between two mobile electronic devices using directed transmission between two servers, according to various embodiments. The features illustrate operations of a server associated with the mobile electronic device that is the recipient of the transfer. The second mobile electronic device can be registered in the server.

At 1010, informational content is received in a second server from a first server. The informational content can be received through a network interface of the second server operable with the Internet. The informational content can be received from other networks.

At 1020, identification information is received in the second server from the first server. The identification information identifies a second mobile electronic device as being the recipient of the informational content, where the transferal of the informational content is initiated by a first mobile electronic device. The first mobile electronic device can be registered as a client in the first server and the second mobile electronic device can be registered as a client in the second server. The identification information includes a unique identifier of the second mobile electronic device.

At 1030, transmission of the informational content from the second server to the second mobile electronic device is scheduled. The scheduling is based on criteria for transmission from the second server to the second mobile electronic device. The criteria can include a correlation between time of transmission and an analysis of one or more parameters of a parameter set for the second mobile electronic device. The parameter set can include modes of transmission and a data size for transferring the informational content. The modes of transmission can include, but are not limited to, cellular wireless, Wi-Fi, or USB. Other parameters can include a priority for the transfer of the informational content from the first mobile electronic device to the second mobile electronic device, and user preference.

At 1040, the informational content is transmitted from the second server to the second mobile electronic device according to the scheduling of transmission.

The various operations performed by the second server can be performed by execution of instructions stored in a machine-readable medium. The form of machine-readable medium is not limited to any one type of machine-readable medium, but can be any machine-readable medium, such as a non-transitory machine-readable storage medium, that can be implemented in a server. Such a server can be configured similar to the servers discussed with respect to of FIGS. 1-6 and 8-13.

Figure 11:
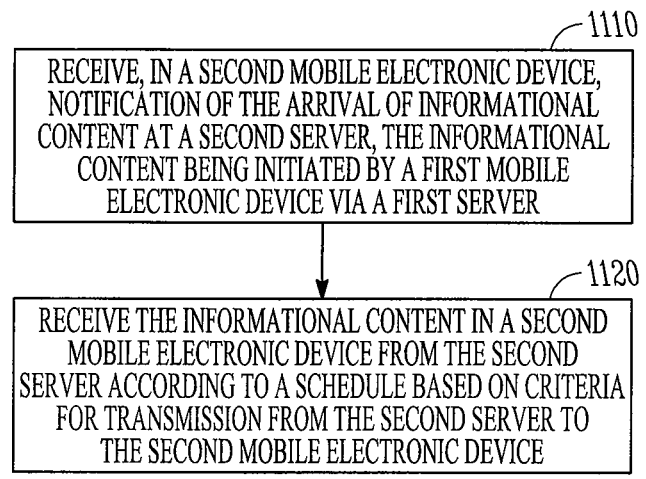
FIG. 11 illustrates features of a method for transferring informational content between two mobile electronic devices using directed transmission between two servers, according to various embodiments.

FIG. 11 illustrates features of a method for transferring informational content between two mobile electronic devices using directed transmission between two servers, according to various embodiments. The features illustrate operations of a mobile electronic device that is the recipient of the transfer of the informational content.

At 1110, notification of the arrival of informational content at a second server is received in a second mobile electronic device. The second mobile electronic device is the recipient of the informational content from a first mobile electronic device sent through a first server to the second server. The first mobile electronic device can be registered as a client in the first server and the second mobile electronic device can be registered as a client in the second server.

At 1120, the informational content is received in the second mobile electronic device from the second server according to a schedule based on criteria for transmission from the second server to the second mobile electronic device. The scheduling is based on criteria for transmission from the second server to the second mobile electronic device. The criteria can include a correlation between time of transmission and an analysis of one or more parameters of a parameter set for the second mobile electronic device. The parameter set can include modes of transmission and a data size for transferring the informational content. The modes of transmission include, but are not limited to, cellular wireless, Wi-Fi, or USB. Other parameters can include a priority for the transfer of the informational content from the first mobile electronic device to the second mobile electronic device, and user preference.

The various operations performed by the second mobile electron device can be performed by execution of instructions stored in a machine-readable medium. The form of machine-readable medium is not limited to any one type of machine-readable medium, but can be any machine-readable medium, such as a non-transitory machine-readable storage medium, that can be implemented in a mobile electronic device. Such a mobile electronic device can be configured similar to the mobile electronic devices discussed with respect to FIGS. 1-5, 7, and 8-13.

Figure 12:
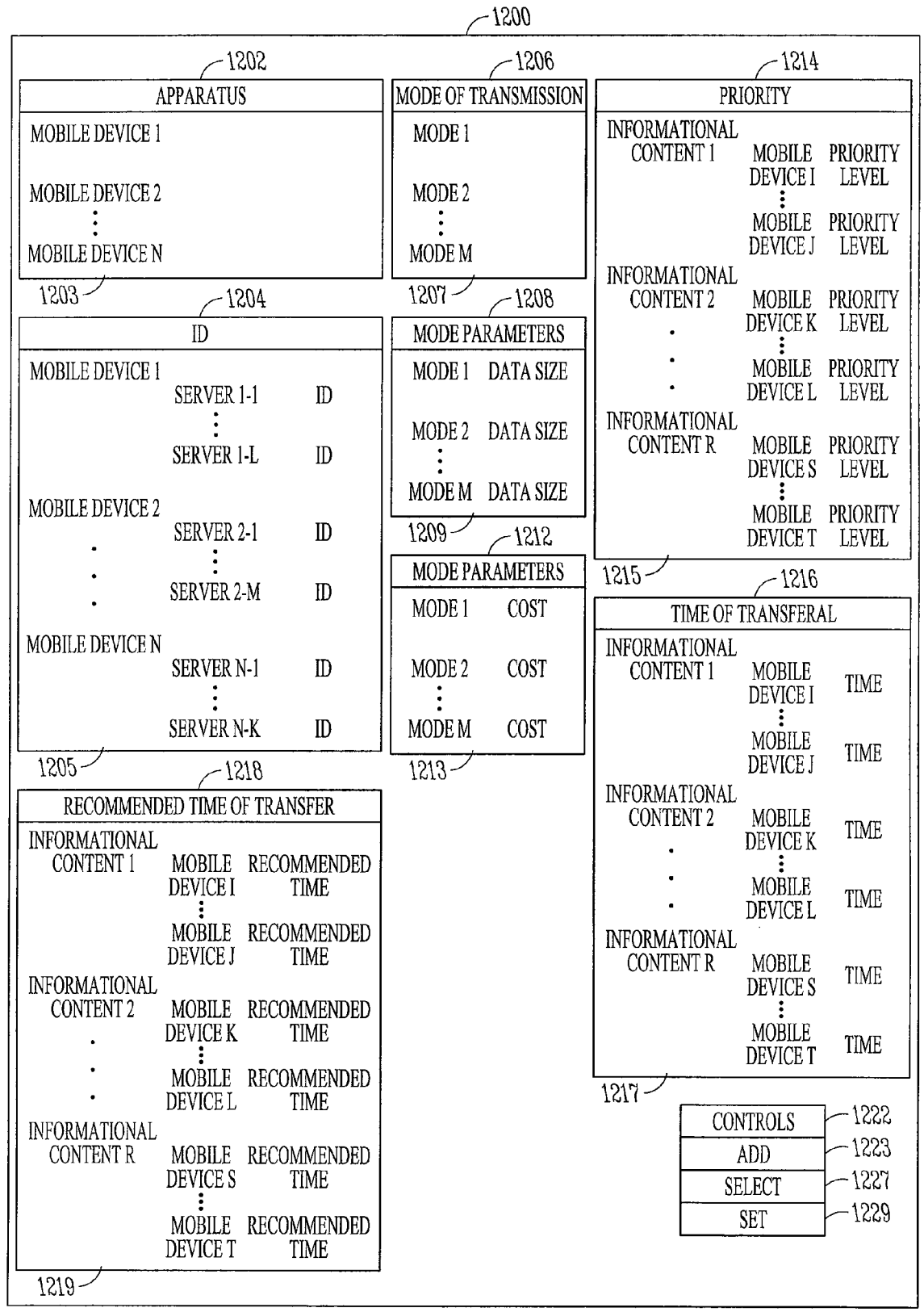
FIG. 12 illustrates a representation of features of an example user interface to assist in the management of informational transfer in accordance with various embodiments.

FIG. 12 illustrates a representation of features of an example user interface 1200 to assist in the management of informational transfer in accordance with various embodiments. An administrator for a mobile electronic device can use user interface 1200 to set parameters for pulling data into the mobile electronic device from a server in which the mobile electronic device is registered and for pushing data from the mobile electronic device to a server in which the mobile electronic device is registered. These parameters become part of the rules for management of informational transfer. User interface 1200 can be implemented in a server. User interface 1200 can include selectable features such as an apparatus 1202, mode of transmission 1206, mode parameters 1210, cost parameters 1212, priority level 1214, time of transferal 1216, recommended time of transferal 1218, and controls 1222 for using these selectable features. The selectable features can be actuated using any of a number of mechanisms such as, but not limited, a keyboard, a conventional mouse-type device that moves a screen pointer 1201, a touch screen, an audio control that converts spoken commands into selection of the feature identified by the spoken command, a wireless control that converts selections wirelessly received from a wireless device into selection of the feature identified, or other selection devices.

A server having user interface 1200 can be configured to interact with a number of mobile electronic devices, where each mobile electronic device is registered in the server. The parameters for informational transferal between the server and each mobile electronic device can be set individually for each mobile electronic device based on the policies associated with the registration of the given each mobile electronic device with the server. The selectable feature apparatus 1202 of user interface 1200 provides a visual display of the mobile electronic device whose parameters are currently displayed by user interface 1200 and can be managed by user interface 1200. This visual display can be presented as interactive display 1203. Interactive display 1203 shows the current mobile electronic device with the current mobile electronic device highlighted, with the current mobile electronic device shown and the other mobile electronic devices not displayed as provided with conventional drop-down boxes, or with other mechanisms to distinguish one mobile electronic device in the group of mobile electronic devices as the currently selected. A mobile electronic device in the list of interactive display 1203 can be selected for management by actuating the listed name of the desired mobile electronic device listed in interactive display 1203, for example, by "clicking" using a mouse-type device with pointer 1201 on the listed name. Alternatively, with the listed name highlighted or otherwise selected, select 1227 of controls 1218 can be actuated. Add 1223 of controls 1222 when activated allows for the input of the identification and parameters of another mobile electronic device to the list of mobile electronic devices registered in the server. Once activated a new display can be automatically generated to set or view the parameters for the mobile electronic device being added to the list.

Once a mobile electronic device is selected, its parameters are displayed for management or providing information about the mobile electronic device. The selected mobile electronic device is a mobile electronic device that can engage in transferal of informational content with other mobile electronic devices including mobile electronic devices not registered in the server but registered in another server. A unique identification for transfer of informational content can be displayed or set using feature trust ID 1204 in which interactive display 1205 lists the group of mobile electronic devices that may engage in informational content transferal and servers in which the mobile electronic devices are registered and in which transferal of informational content is permitted. The unique identification for a mobile electronic devices may be entered by selecting the mobile electronic device and its server in interactive display 1205. Alternatively, selecting the mobile electronic device and its server in interactive display 1205 initiates a process of communication between the server and the selected server of the selected mobile electronic device/server in which the selected server provides the unique identifier if appropriate permission is set in the selected server by the administrator of the server for the selected mobile electronic device. The appropriate administrator for providing information for such informational content transfer can be the user of the selected mobile electronic device. Add 1223 or other mechanisms can be used to initiate addition of new mobile electronic device/server pairs to interactive display 1205.

The mode of transmission 1206 feature provides an interactive display 1207 of the modes of transmission. Interactive display 1207 for mode of transmission 1206 shows the current mode of transmission with the current mode highlighted, with the current mode shown and the other modes not displayed as provided with conventional drop-down boxes, or other mechanism to distinguish one mode in the group of modes as the currently selected. The current mode can be displayed as a function of instructions stored in a machine-readable medium of the server, such as a non-transitory machine-readable storage medium, based on parameters stored in the memory of the server. The modes of transmission can include, but are not limited to, cellular transmission, Wi-Fi, and USB. Add 1223 can be selected to add new modes.

The mode parameters 1208 feature provides an interactive display 1209 of data parameters for the modes listed interactive display 1207. The data parameter for each mode can be set to indicate a range of data sizes appropriate for using the mode of transmission. This range can be used when the priority for sending informational content is of such low priority that the informational content can be sent at any time. With the modes listed in interactive display 1209 in ascending order of data size for sending the informational content the data sizes, which can be set, are cut-off sizes. The currently displayed size indicates that informational content in a format having a data size greater than the cut-off level will not be sent by the mode of transmission indicated unless over-ridden by the user of the mobile electronic device. When new modes of transmission are added to interactive display 1207, additional entries in interactive display 1209 are generated. These new entries can be populated by the user. Alternatively, these new entries can be populated by execution of instructions in a machine-readable medium of the server, such as a non-transitory machine-readable storage medium, where the instructions include evaluation of data size with respect to mode of transmission. This evaluation can include cost parameters for the mode of transmission.

Cost parameters 1212 feature provides an interactive display 1213 of cost parameters for the modes listed in interactive display 1207. The cost for each mode can be set by a user using interactive display 1213. Alternatively, selection of cost parameters 1212 can initiate population of the entries for the listed modes by execution of instructions in a machine-readable medium of the server, such as a non-transitory machine-readable storage medium. Selection of a mode listed in interactive display 1213 can initiate the population of the entry for the selected mode by execution of instructions in a machine-readable medium of the server, such as a non-transitory machine-readable storage medium. When a new mode of transmission is added the cost parameters 1212 may be activated for user input, when user input is the selected method for parameter update. These costs associated with the listed modes of transmission can be used with a level of priority for transferring informational content.

Priority level 1214 feature provides an interactive display 1215 of priority for each identified informational content for transfer with respect to the mobile electronic device highlighted or otherwise identified in apparatus 1202 feature. The priority level for each information content can be set individually for the specified mobile electronic device to which the given information content is to be sent. The priority levels for a particular informational content may differ among the group of mobile electronics devices to which it is to be sent. Activation of priority level 1214 such as by use of pointer 1201 and add 1229 can be used to add new informational content to be sent. In addition, a list of mobile electronics devices to be recipients of the new informational content can be updated. In addition, one or more new mobile electronics devices can be added to receive informational content currently identified as scheduled for transfer. The time to transmit the informational content can be set by the user of the mobile electronic device identified feature apparatus 1202 or the administrator of the server on which user interface 1200 resides.

Time of transferal 1216 feature provides an interactive display 1217 of the time for transferring informational content between the server and the mobile electronic device highlighted or otherwise identified in apparatus 1202 feature. Optionally, interactive display 1217 can display for each informational content the one or more mobile electronic devices associated with the transfer of the respective informational content. With multiple mobile electronic devices shown for a given informational content, the identification of one or more of these multiple electronic devices as the trust partner associated with the highest priority level for the transfer of the informational content can be provided by highlighted or otherwise indicating such mobile electronic device.

Activation of time of transferal 1216, such as by use of pointer 1201 and add 1229 or other method, can be used by the user to set the times of transfer for each of the informational content. Activation of a particular informational content in interactive display 1217, such as by use of pointer 1201 or add 1229 or other method, can be used by the user to set the times of transfer for the particular informational content. The time entries of the time of transfer for each informational content listed in interactive display 1217 can be performed by execution of instructions in a machine-readable medium of the server, such as a non-transitory machine-readable storage medium, that takes into account the transfer of each informational content and the various parameters for transferring each informational content to the identified mobile electronic devices and generates recommended times to transfer each informational content. These recommended times may be listed in interactive display 1217 that can be overwritten by the user.

Recommended time of transferal 1218 feature shows the recommended times to transfer each informational content shown in recommended time of transferal 1218. This recommended time can be maintained though the user has overridden the use of the recommended time in interactive display 1217. Maintaining the recommended time allows the user to reconfigure the time for transfer of a given informational content to the recommended time, though he had previously overridden the recommended time in interactive display 1217. Prior to the time set in interactive display 1217 for a particular informational content, a user can activate a recommended time for the corresponding informational content listed in interactive display 1219. Upon activation of a recommended time or its corresponding informational content listed in interactive display 1219, the time of transfer for the informational content is automatically updated in interactive display 1217.

In various embodiments, a change in parameter may include actuating the command, set 1229, to finalize the change. The various changes to parameters are stored in a database of the server by writing over the parameter in the memory location of the parameter in the database. The parameters and features displayed by user interface 1200 can be realized with user interface arranged as one or more user interfaces. A user interface similar to user interface 1200 can also be configured in a mobile electronic device with selectable feature apparatus 1202 indicating the servers in which the mobile electronic device is registered rather than a list of mobile electronic devices. Other features of user interface 1200 can be similarly modified for use in a mobile electronic device. Having such a user interface in a mobile electronic device allows for management operations of data transferals associated with the mobile electronic device to be managed in the mobile electronic device. Such operations can include management of the parameters for transfer of informational content, corresponding to the mobile electronic device, with other mobile electronic devices in a trust relationship using a server in which the mobile electronic device is registered and another server in which the other mobile electronic device is registered.

Figure 13:
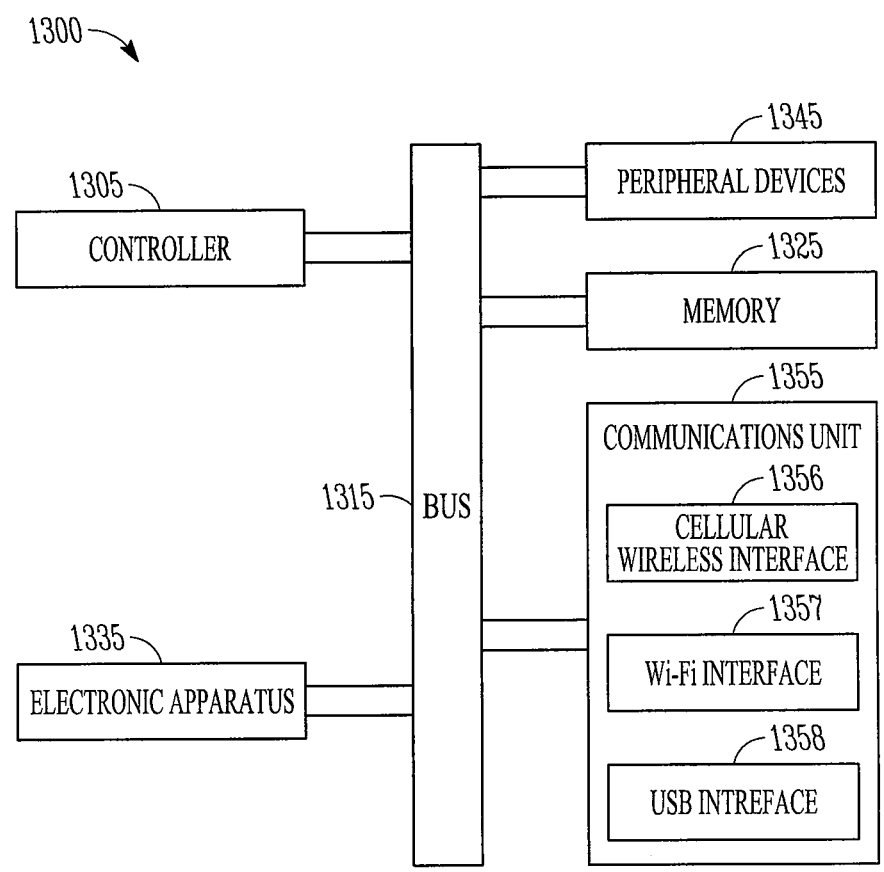
FIG. 13 depicts a diagram of an embodiment of a system having a controller and a memory system, according to various embodiments.

FIG. 13 depicts a block diagram of features of an embodiment of a system 1300 having a controller 1305, a memory 1325, and a communications unit 1355. Controller 1305, a memory 1325, and a communications unit 1355 can be arranged as a system configured to engage in the transfer of informational content between two mobile electronic devices using directed transmission between two servers. One of the mobile electronic devices can be registered in one of the servers and the other mobile electronic devices can be registered in the other server. Communications unit 1355 can be configured to operate in one or more modes of transmission. Such modes of transmission can be realized using interface units such as cellular wireless interface 1356, Wi-Fi interface 1357, and USB interface 1358.

System 1300 can also include electronic apparatus 1335 and a bus 1315, where bus 1315 provides electrical conductivity among the components of system 1300. Bus 1315 can include an address bus, a data bus, and a control bus, each independently configured. In an alternative embodiment, bus 1315 can use common conductive lines for providing one or more of address, data, or control, the use of which is regulated by controller 1305. In an embodiment, electronic apparatus 1335, which can be coupled to bus 1315, may be an additional memory system configured in a manner similar to memory system 1325. In various embodiments, peripheral devices 1345 include displays, additional storage memory system, and/or other control devices that may operate in conjunction with controller 1305 and/or memory 1325. In an embodiment, controller 1305 is a processor. A peripheral device arranged as a display can be used with instructions stored in memory 1325 to implement a user interface to manage one or more system components operable to engage in the transfer of informational content between two mobile electronic devices using directed transmission between two servers.

Controller 1305, a memory 1325, and communications unit 1355 can be arranged to manage media content and associated information on system 1300. In an embodiment, system 1300 is arranged as a PC. The PC may include instrumentality distributed throughout the PC to operate as a wireless server. System 1300 arranged as a PC can operate according to any of the various embodiments discussed herein to engage in transfer of informational content with a mobile electronic device such as a mobile wireless device.

In an embodiment, system 1300 is arranged as a mobile electronic device. The mobile electronic device can be a mobile wireless device. System 1300 arranged as a mobile device can operate according to any of the various embodiments discussed herein to engage in transfer of informational content with a wireless server such as a wireless server implemented within a PC.

Various embodiments or combination of embodiments for apparatus and methods for a system, such as a PC, to engage as a system in the transfer of informational content between two mobile electronic devices using directed transmission between two servers, as described herein, can be realized in hardware implementations, software implementations, and combinations of hardware and software implementations. One of the mobile electronic devices can be registered in one of the servers and the other mobile electronic devices can be registered in the other server. These implementations may include a machine-readable medium, such as a non-transitory machine-readable storage medium, having machine-executable instructions, such as a computer-readable medium having computer-executable instructions, for operating the system in a relationship with one or more mobile electronic devices such that transferal of informational content between the system and the mobile electronic device and between the system and another server is managed. The communications of the system with a mobile wireless device can be conducted on a secured basis. The machine-readable medium is not limited to any one type of medium.

Various embodiments or combination of embodiments for apparatus and methods for a mobile electronic device, such as a mobile wireless device, as described herein, can be realized in hardware implementations, software implementations, and combinations of hardware and software implementations. These implementations may include a machine-readable medium, such as a non-transitory machine-readable storage medium, having machine-executable instructions, such as a computer-readable medium having computer-executable instructions, for operating the mobile device to manage transferal of informational content between the mobile electronic device and a system, such as a PC, and between the mobile electronic device and another mobile electronic device. The communications between a mobile wireless device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
receiving a command over a secure communication channel linking a first server to a first mobile electronic device to transfer informational content from the first server to a second mobile electronic device, wherein the first mobile electronic device registered in the first server as a managed client such that the first mobile electronic device is managed by the first server, wherein the secure communications channel is based on the first mobile electronic device being registered with the first server, the informational content being information for direct use by a user receiving the information, and the information for direct use by the user being different from data exchange between devices operating to accomplish a task not directly perceived by the user; and initiating from the first server, based on receiving the command from the first mobile electronic device, a directed transmission between the first server and a second server to transfer the informational content between the first mobile electronic device and the second mobile electronic device,
the second mobile electronic device registered in the second server as a managed client such that the second mobile electronic device is managed by the second server,
wherein the first mobile electronic device is not registered as a managed client of the second server and the second mobile electronic device is not registered as a managed client of the first server.

2. The method of claim 1, wherein the method comprises:
receiving the informational content in the first server from the first mobile electronic device; and
receiving identification information in the first server from the first mobile electronic device such that the identification information identifies the second mobile electronic device as being the recipient of the informational content specified for transmission from the first server, the identification information including a unique identifier of the second mobile electronic device, and
wherein the directed transmission is based on the identification information.

3. The method of claim 2, wherein receiving the informational content in the first server from the first mobile electronic device is based on criteria for transmission from the first mobile electronic device to the first server, the criteria including a correlation between time of transmission and an analysis of one or more parameters of a parameter set, the parameter set including modes of transmission, a data size for transferring the informational content, a priority for the transfer of the informational content from the first mobile electronic device to the second mobile electronic device, and user preference.

4. The method of claim 3, wherein the modes of transmission includes one or more of cellular wireless, Wi-Fi, or USB.

5. The method of claim 3, wherein the method includes:
analyzing, in the first server, the criteria; and
sending, to the first mobile electronic device from the first server, a recommended time for sending the informational content to the first server from the first mobile electronic device, the recommended time based on analyzing the criteria.

6. The method of claim 5, wherein analyzing parameters includes determining a time to transfer the informational content and a mode of transmission, the determination based on comparing modes of transmission available including cellular wireless, Wi-Fi, and USB relative to data size of the informational content with respect to speed of transferal in each of the modes of transmission and the cost of the transfer of the informational content associated with each mode of transmission.

7. The method of claim 1, wherein the method comprises:
selecting, in the first mobile electronic device, the informational content for transfer to the second mobile electronic device;
determining, in the first mobile electronic device, a unique identifier of the second mobile electronic device, the unique identifier associated with transfers from the first mobile electronic device to the second mobile electronic device;

sending the unique identifier from the first mobile electronic device to the first server to transfer the informational content from the first server to the second server; and transmitting the informational content from the first mobile electronic device to the first server such that initiating transfer of the informational content to the first server is based on criteria for transmission from the first mobile electronic device to the first server.

8. The method of claim 7, wherein initiating transfer of the informational content to the first server based on criteria includes initiating transfer based a correlation between time of transmission and an analysis of one or more parameters of a parameter set, the parameter set including modes of transmission and a data size for transferring the informational content.

9. The method of claim 8, wherein the correlation and the analysis is performed in the first mobile electronic device.

10. The method of claim 8, wherein initiating transfer of the informational content to the first server includes initiating the transfer of the informational content based on a time set by a user of the first mobile electronic device.

11. The method of claim 1, wherein the method comprises:
receiving the informational content in the second server from the first server;
receiving identification information in the second server from the first server such that the identification information identifies the second mobile electronic device as being the recipient of the informational content, the identification information including a unique identifier of the second mobile electronic device;
scheduling transmission of the informational content from the second server to the second mobile electronic device such that the scheduling is based on criteria for transmission from the second server to the second mobile electronic device; and
transmitting the informational content from the second server to the second mobile electronic device according to the scheduling of transmission.

12. The method of claim 11, wherein scheduling transmission of the informational content from the second server to the second mobile electronic device includes scheduling the transmission based a correlation between time of transmission and an analysis of one or more parameters of a parameter set, the parameter set including modes of transmission and a data size for transferring the informational content.

13. The method of claim 12, wherein the modes of transmission includes one or more of cellular wireless, WiFi, or USB.

14. The method of claim 1, wherein the method comprises analyzing transferal characteristics associated with transferring the informational content from the first mobile electronic device to the second mobile electronic device, the transferring of the informational content having three transfer segments including a segment transferring the informational content from the first mobile electronic device to the first server, a segment transferring the informational content from the first server to the second server, a segment transferring the informational content from the second server to the second mobile electronic device; and
scheduling transferal initiation for a transfer segment of the three transfer segments, the scheduling based on criteria that include transferal characteristics of the transfer segment or user preference or both transferal characteristics of the transfer segment and user preference.

15. A machine-readable non-transitory storage medium that stores instructions, which when performed by a machine, cause the machine to perform operations comprising:
receiving a command over a secure communication channel linking a first server to a first mobile electronic device to transfer informational content from a first server to a second mobile electronic device, wherein the first mobile electronic device registered in the first server as a managed client such that the first mobile electronic device is managed by the first server, wherein the secure communications channel is based on the first mobile electronic device being registered with the first server, the informational content being information for direct use by a user receiving the information, and the information for direct use by the user being different from data exchange between devices operating to accomplish a task not directly perceived by the user; and
initiating from the first server, based on receiving the command from the first mobile electronic device, a directed transmission between the first server and a second server to transfer the informational content between the first mobile electronic device and the second mobile electronic device,
the first mobile electronic device registered in the first server as a managed client such that the first mobile electronic device is managed by the first server and the second mobile electronic device registered in the second server as a managed client such that the second mobile electronic device is managed by the second server, wherein the first mobile electronic device is not registered as a managed client of the second server and the second mobile electronic device is not registered as a managed client of the first server.

16. The machine-readable non-transitory storage medium of claim 15, wherein the instructions include instructions to operate as the first server to perform operations comprising:
receiving the informational content in the first server from the first mobile electronic device; and
receiving identification information in the first server from the first mobile electronic device such that the identification information identifies the second mobile electronic device as being the recipient of the informational content specified for transmission from the first server, the identification information including a unique identifier of the second mobile electronic device, and
wherein the directed transmission is based on the identification information.

17. The machine-readable non-transitory storage medium of claim 15, wherein the instructions include instructions to operate as the first mobile electronic device to perform operations comprising:
selecting, in the first mobile electronic device, the informational content for transfer to the second mobile electronic device;
determining, in the first mobile electronic device, a unique identifier of the second mobile electronic device, the unique identifier associated with transfers from the first mobile electronic device to the second mobile electronic device;
sending the unique identifier from the first mobile electronic device to the first server to transfer the informational content from the first server to the second server; and
transmitting the informational content from the first mobile electronic device to the first server such that initiating transfer of the informational content to the first server is based on criteria for transmission from the first mobile electronic device to the first server.

18. The machine-readable non-transitory storage medium of claim 15, wherein the instructions include instructions to operate as the second server to perform operations comprising:
   receiving the informational content in the second server from the first server;
   receiving identification information in the second server from the first server such that the identification information identifies the second mobile electronic device as being the recipient of the informational content, the identification information including a unique identifier of the second mobile electronic device;
   scheduling transmission of the informational content from the second server to the second mobile electronic device such that the scheduling is based on criteria for transmission from the second server to the second mobile electronic device; and
   transmitting the informational content from the second server to the second mobile electronic device according to the scheduling of transmission.

19. A server comprising:
   one or more processors;
   memory operatively coupled to the one or more processors, the memory configured to store instructions to:
   receiving a command over a secure communication channel linking a first server to a first mobile electronic device to transfer informational content to a second mobile electronic device, wherein the first mobile electronic device registered in the first server as a managed client such that the first mobile electronic device is managed by the first server, wherein the secure communications channel is based on the first mobile electronic device being registered with the first server, the informational content being information for direct use by a user receiving the information, and the information for direct use by the user being different from data exchange between devices operating to accomplish a task not directly perceived by the user; and
   initiate, based on receiving the command from the first mobile electronic device, a directed transmission of the informational content with an other server to transfer the informational content to the second mobile electronic device, wherein the server is operable to have one of the first and second mobile electronic devices registered in the server as a managed client such that the registered mobile electronic device is operatively managed by the server and the other one of the first and second mobile electronic devices is not registered as a managed client of the server; and
   a network interface arranged to operatively couple to a network to implement at least directed transmission with the other server.

20. The server of claim 19, wherein the instructions include instructions to operate the server to:
   receive the informational content from the first mobile electronic device; and
   receive identification information from the first mobile electronic device such that the identification information identifies the second mobile electronic device as being the recipient of the informational content specified for transmission from the server, the identification information including a unique identifier of the second mobile electronic device; and
   wherein the directed transmission is based on the identification information.

21. The server of claim 19, wherein the instructions include instructions to operate the server to:
   receive the informational content from the other server;
   receive identification information from the other server such that the identification information identifies the first mobile electronic device as being the recipient of the informational content, the identification information including a unique identifier of the first mobile electronic device;
   scheduling transmission of the informational content from the server to the first mobile electronic device such that the scheduling is based on criteria for transmission from the server to the first mobile electronic device; and
   transmitting the informational content from the server to the first mobile electronic device according to the scheduling of transmission.

22. The server of claim 19, wherein a network interface is operable with the Internet to conduct directed transmission to and from the other server.

23. A mobile electronic device comprising:
   one or more processors;
   memory responsive to the one or more processors, the memory arranged to store instructions to:
   engage in a transfer of informational content with an other mobile electronic device using directed transmission between a first server and a second server, the informational content being information for direct use by a user receiving the information; and
   transmit a command, over a secure communication channel linking the mobile electronic device to a first server, to use directed transmission between the first server and the second server to transfer the informational content to the other mobile electronic device,
   the directed transmission based on the mobile electronic device being operatively registered in the first server as a managed client such that the mobile electronic device is managed by the first server and the mobile electronic device is not registered in a share group of the first and second servers with the other mobile electronic device, and wherein the secure communications channel is based on the mobile electronic device being registered with the first server; and
   a transmission interface responsive to execution of the instructions to transmit the command.

24. The mobile electronic device of claim 23, wherein the instructions include instructions to operate the mobile electronic device to:
   select the informational content for transfer to the other mobile electronic device;
   determine a unique identifier of the other mobile electronic device, the unique identifier associated with transfers from the mobile electronic device to the other mobile electronic device;
   send the unique identifier to the first server to transfer the informational content from the first server to the second server; and
   transmit the informational content to the first server such that initiating transfer of the informational content to the first server is based on criteria for transmission from the first mobile electronic device to the first server.

25. The mobile electronic device of claim 24, wherein the criteria includes modes of transmission and a data size for transferring the informational content.

26. The mobile electronic device of claim 23, wherein a transmission interface is compatible with one of more modes of transmission selected from of cellular wireless, WiFi, and USB.

* * * * *